United States Patent
Di Benedetto et al.

(10) Patent No.: US 9,628,334 B2
(45) Date of Patent: Apr. 18, 2017

(54) VLAN TAGGING IN A VIRTUAL ENVIRONMENT

(71) Applicant: Cisco Technology, Inc., San Jose, CA (US)

(72) Inventors: Marco Di Benedetto, Santa Clara, CA (US); Alessandro Carpi, San Jose, CA (US); Sunil Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 14/577,803

(22) Filed: Dec. 19, 2014

(65) Prior Publication Data

US 2016/0182293 A1   Jun. 23, 2016

(51) Int. Cl.
```
G06F 15/16      (2006.01)
H04L 12/24      (2006.01)
H04L 29/08      (2006.01)
H04L 12/46      (2006.01)
```

(52) U.S. Cl.
CPC ...... *H04L 41/0816* (2013.01); *H04L 12/4645* (2013.01); *H04L 12/4675* (2013.01); *H04L 29/08072* (2013.01)

(58) Field of Classification Search
CPC .......................... H04L 29/06; H04L 61/2076
USPC .......................... 709/220, 224, 228; 370/254
See application file for complete search history.

(56) References Cited

U.S. PATENT DOCUMENTS

| | | | | |
|---|---|---|---|---|
| 8,645,509 B2 * | 2/2014 | Carriere | ............. | H04L 12/4641 370/254 |
| 8,972,539 B2 * | 3/2015 | Carriere | ............. | H04L 12/4641 370/254 |
| 9,219,617 B2 * | 12/2015 | Newton | ............. | H04L 12/4641 |
| 2006/0198323 A1 | 9/2006 | Finn | | |
| 2008/0172497 A1 | 7/2008 | Mohan et al. | | |
| 2010/0329265 A1 | 12/2010 | Lapuh et al. | | |
| 2011/0035494 A1 * | 2/2011 | Pandey | ................. | G06F 9/5077 709/224 |
| 2012/0089713 A1 * | 4/2012 | Carriere | ............. | H04L 12/4641 709/222 |

(Continued)

FOREIGN PATENT DOCUMENTS

EP    1039698 A1    9/2000

OTHER PUBLICATIONS

International Search Report and Written Opinion in counterpart International Application No. PCT/US2015/066566, mailed Jul. 6, 2016, 19 pages.

(Continued)

*Primary Examiner* — Khanh Dinh

(57) ABSTRACT

VLAN tagging in a virtual environment is described, including configuring a set of VLAN tagging parameters for each virtual network device to be used by the virtual network device to correctly perform VLAN tagging of frames in response to configuration changes with respect to the virtual network device. A first example of a configuration change with respect to the virtual network device comprises the virtual network device being transitioned from being attached to a virtual switch tagging (VST) port group to being attached to a virtual guest tagging (VGT) port group. A second example of a configuration change with respect to the virtual network device comprises the virtual network device being migrated from a first host to a second host.

35 Claims, 13 Drawing Sheets

(56) References Cited

U.S. PATENT DOCUMENTS

| | | |
|---|---|---|
| 2013/0185416 A1 | 7/2013 | Larkin et al. |
| 2013/0301472 A1 | 11/2013 | Allan |
| 2013/0322453 A1 | 12/2013 | Allan |
| 2014/0089524 A1* | 3/2014 | Carriere .............. H04L 12/4641 |
| | | 709/245 |
| 2014/0321458 A1 | 10/2014 | Kariya |

OTHER PUBLICATIONS

Partial International Search Report in Invitation to Pay Additional Fees and, where Applicable, Protest Fee mailed Apr. 20, 2016 in corresponding International Application No. PCT/US2015/066566.

* cited by examiner

VLAN TAGGING IN A VIRTUAL ENVIRONMENT

BACKGROUND OF THE INVENTION

The IEEE 802.1Q networking standard defined a system of virtual local area network (VLAN) tagging for Ethernet frames to be used by switches in handling such frames. A "VLAN tag" is information that can be added into an Ethernet frame to identify a particular VLAN to which the frame is destined.

BRIEF DESCRIPTION OF THE DRAWINGS

Various embodiments of the invention are disclosed in the following detailed description and the accompanying drawings.

DETAILED DESCRIPTION

Figure 1:
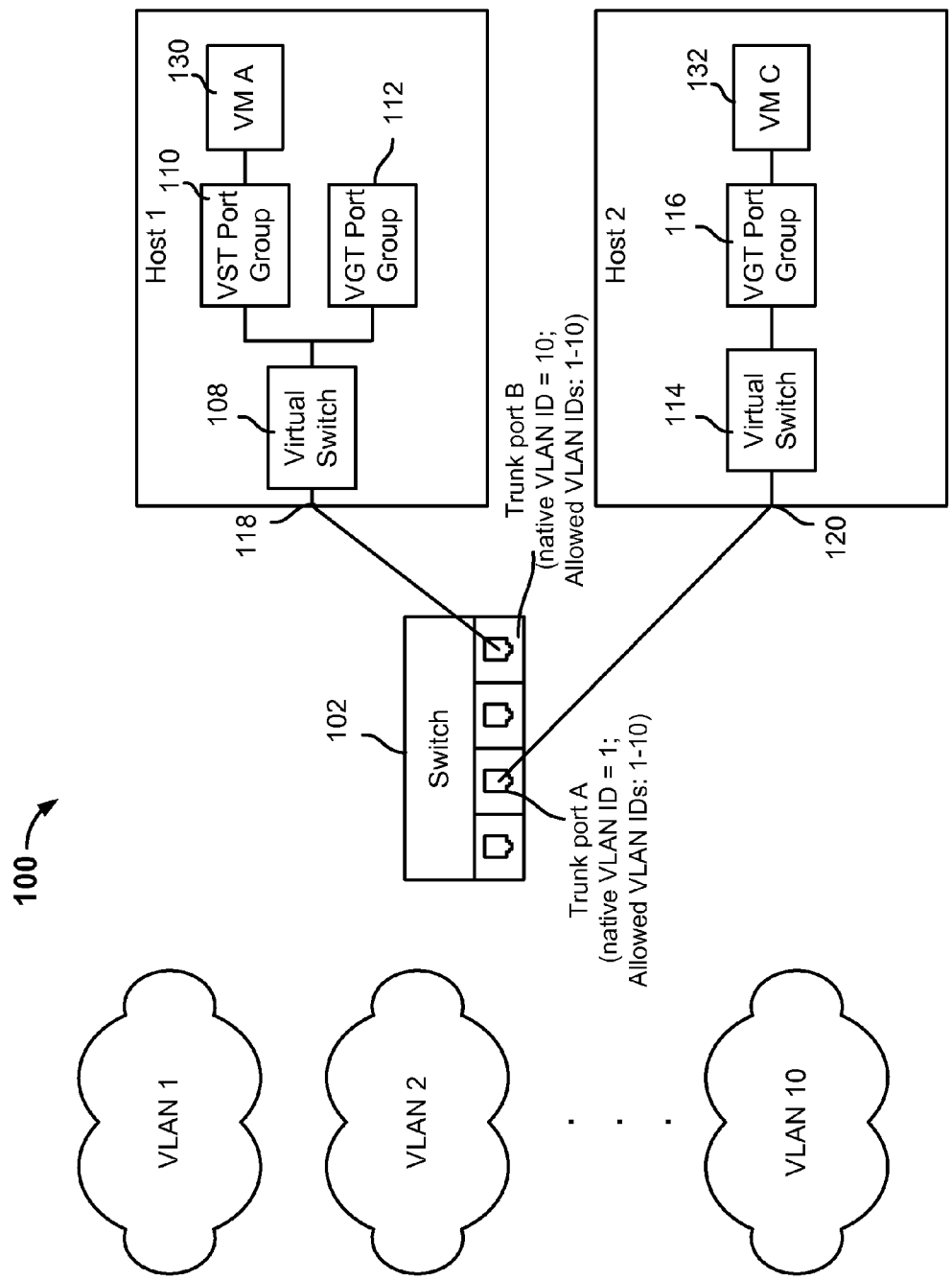
FIG. 1 is a diagram showing an example of a conventional network infrastructure that supports VLAN tagging.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A VLAN comprises a broadcast domain that is mutually isolated from another VLAN. VLANs can be configured through software rather than hardware. By using VLANs, a network can be partitioned based on logical groupings instead of the physical topology.

To facilitate communication between devices located in different VLANs, the IEEE 802.1Q networking standard defined a system of VLAN tagging for Ethernet frames. "Tagging" or "VLAN tagging" refers to adding information (e.g., a VLAN value or ID) into a frame that can be used to identify a VLAN to which the frame is to be passed (e.g., because the destination device is located within that VLAN). "Tagged" traffic refers to frames with VLAN tags and "untagged" traffic refers to frames without VLAN tags. One common form of VLAN tagging is port-based VLAN tagging.

A port (interface) of a physical switch may be configured as a "trunk" port. A trunk port typically accepts only frames with VLAN tags. However, a special VLAN ID (called a "native" VLAN ID) can be configured for each physical switch trunk port. When the physical switch trunk port accepts frames without VLAN tags, the physical switch trunk port will consider these untagged frames as implicitly belonging to the native VLAN ID and therefore send the untagged VLAN frames to the VLAN associated with the native VLAN ID. Put another way, once an untagged frame is sent on the wire, if and only if the recipient physical switch port is configured in trunk mode with a native VLAN, then such a frame will be considered as belonging in the native VLAN. In some cases, when the physical switch trunk port accepts frames with a VLAN tag that is equal to its configured native VLAN ID, the physical switch trunk port will drop such frames. When the physical switch trunk port receives frames that are tagged with VLAN IDs other than the native VLAN ID, then the physical switch trunk port will pass such frames to the VLANs identified by their respective VLAN tags. A trunk port of a physical switch can also be associated with a range/set of allowed VLAN IDs. The physical switch trunk port will pass along an Ethernet frame that it receives if its associated tag is within its configured range/set of allowed VLAN IDs but drop an Ethernet frame that it receives if its associated tag is not within its configured range/set of allowed VLAN IDs.

In a virtual environment, an interface of a host may be attached to a particular trunk port of a physical switch. In various embodiments, a "host" is a particular server running an operating system enabling computer virtualization functionalities. An example of such an operating system is usually known as "hypervisor." The host may include a virtual switch that is configured to pass frames from a particular interface of the host. The virtual switch can be associated with various port groups. Each port group of the virtual switch includes one or more virtual switch ports that are associated with similar characteristics. A port group may be attached to one or more virtual machines (VMs) running on the host and is configured to pass along frames received from the attached VMs to the respective trunk ports of the physical switch. Whether a port group tags an Ethernet frame that it receives from a VM depends on the type associated with that port group. A port group is attached a virtual network interface card (vNIC) belonging to a VM and a VM may have multiple vNICs. For purposes of illustration, in the examples described herein, it is assumed that each VM has only one vNIC and that vNIC is attached to a port group such that when the VM is described to be operating in a mode such as "trunk" or "access" mode, the VM can be assumed to operate its interface in that mode.

In some embodiments, a first type of port group is a "virtual switch tagging" (VST) port group. A VST port group is configured to receive an untagged Ethernet frame from an attached VM and determine whether to tag the untagged frame based on the VLAN ID configured for that port group. In some embodiments a special VLAN ID value (i.e., VLAN ID=0) can be used to indicate "do not tag."

In some embodiments, a second type of port group, a "virtual guest tagging" (VGT) port group, is configured to permit both tagged and untagged traffic from a virtual network device to pass through and is not configured to tag an Ethernet frame received from an attached VM. Instead, a VM that is attached to a VGT port group may be assigned a VLAN ID and the VM itself is configured to determine whether to tag a frame based on the VLAN ID assigned for that VM.

A VM can be configured in "access" or "trunk" mode depending on whether it is attached to a VST port group or a VGT port group and if the VM is attached to a VGT port group. A VM that is attached to a VST port group is limited to operating in "access" mode and sends only untagged frames because the VST port group will be responsible for tagging the frames. Put another way, a VM that is attached to a VST port group is always in the "access" mode in the sense that the VST port group always tags with the VLAN ID assigned to that port group. A VM that is attached to a VGT port group is "trunking capable," meaning that the VM can be in either "access" or "trunk" mode depending on a configuration by the administrator of the VM. Put another way, a VM that is attached to a VGT port group is capable of operating in two possible modes: "access" mode and "trunk" mode. As such, because a VM that is attached to a VGT port group can be configured to operate in the "trunk" mode, such a VM is sometimes referred to as being "trunking capable." Conventionally, a VM that is attached to a VGT port group and remains in "access" mode still does not tag its own outgoing traffic, which can lead to some problems, as will be described further below. Conventionally, a VM that is attached to a VGT port group and is configured to be in "trunk" mode and has been assigned a VLAN ID will tag its own outgoing traffic with the assigned VLAN ID.

FIG. 1 is a diagram showing an example of a conventional network infrastructure that supports VLAN tagging. In the example, system 100 includes physical switch 102 (e.g., Cisco Nexus 5000 series physical switch). Trunk port A of physical switch 102 is configured with native VLAN 1, which indicates that untagged traffic received at trunk port A will be sent to VLAN 1 and tagged traffic received at trunk port A will be sent to the VLAN identified by the VLAN tag included in the frames. Furthermore, trunk port A of physical switch 102 is configured with allowed VLAN ID range: 1-10, which indicates that traffic received at trunk port A tagged with VLAN IDs within that range will be passed along but traffic tagged with VLAN IDs outside of that range will be dropped. Trunk port B of physical switch 102 is configured with native VLAN 10, which indicates that untagged traffic received at trunk port B will be sent to VLAN 10 and tagged traffic received at trunk port B will be sent to the VLAN identified by the VLAN tag included in the frames. Furthermore, trunk port B of physical switch 102 is configured with allowed VLAN ID range: 1-10, which indicates that traffic received at trunk port B tagged with VLAN IDs within that range will be passed along but traffic tagged with VLAN IDs outside of that range will be dropped.

In system 100, interface 118 of Host 1 is connected to trunk port B and therefore, untagged traffic sent from interface 118 of Host 1 will be sent to VLAN 10 and tagged traffic sent from interface 118 of Host 1 will be sent to the VLAN identified by the VLAN tag of the traffic. Similarly, interface 120 of Host 2 is connected to trunk port A and therefore, untagged traffic sent from interface 120 of Host 2 will be sent to VLAN 1 and tagged traffic sent from interface 120 of Host 2 will be sent to the VLAN identified by the VLAN tag of the traffic. For example, each of Host 1 and Host 2 comprises a physical server. An example of an implementation of either one or both of Host 1 and Host 2 is a Dell server 12CPUx2.5 GHz, 48 GB of RAM, 256 GB of solid state disk storage, running a hypervisor of VMware ESXi 5.5.

Also in system 100, virtual machine (VM) A 130 is running on Host 1 and virtual machine (VM) C 132 is running on Host 2. VM A 130 is attached to VST port group 110 of virtual switch 108 of Host 1. Frames sent from VM A 130 will be received at virtual switch 108 and sent from interface 118 of Host 1 to trunk port B of physical switch 102. VM C 132 is attached to VGT port group 116 of virtual switch 114 of Host 2. Frames sent from VM C 132 will be received at virtual switch 114 and sent from interface 120 of Host 2 to trunk port A of physical switch 102.

As described above, a VST port group, such as VST port group 110 of Host 1, performs VLAN tagging on received traffic and is configured with a particular VLAN ID. For example, VST port group 110 drops tagged traffic it receives (e.g., from VM A 130) and determines how to tag untagged traffic that it receives (e.g., from VM A 130) based on its configured VLAN ID. Sometimes, VST port group 110 drops all tagged traffic received by the VM A 130 and from the outside world, unless the tagged traffic belongs to the specified VLAN ID.

In contrast, a VGT port group, such as VGT port group 112 of Host 1 and VGT port group 116 of Host 2, does not perform VLAN tagging on received traffic and instead, allows both tagged and untagged received traffic to pass through. As such, a VM (e.g., VM C 132 running on Host 2) that is attached to a VGT port group is "trunking capable," meaning that the VM is responsible for tagging its own traffic so that the traffic can be sent to the correct VLAN (e.g., in which a desired destination virtual network device is located). Conventionally, attaching a VM to a VGT port group enables VLAN tagging at the VM-level.

Figure 2:
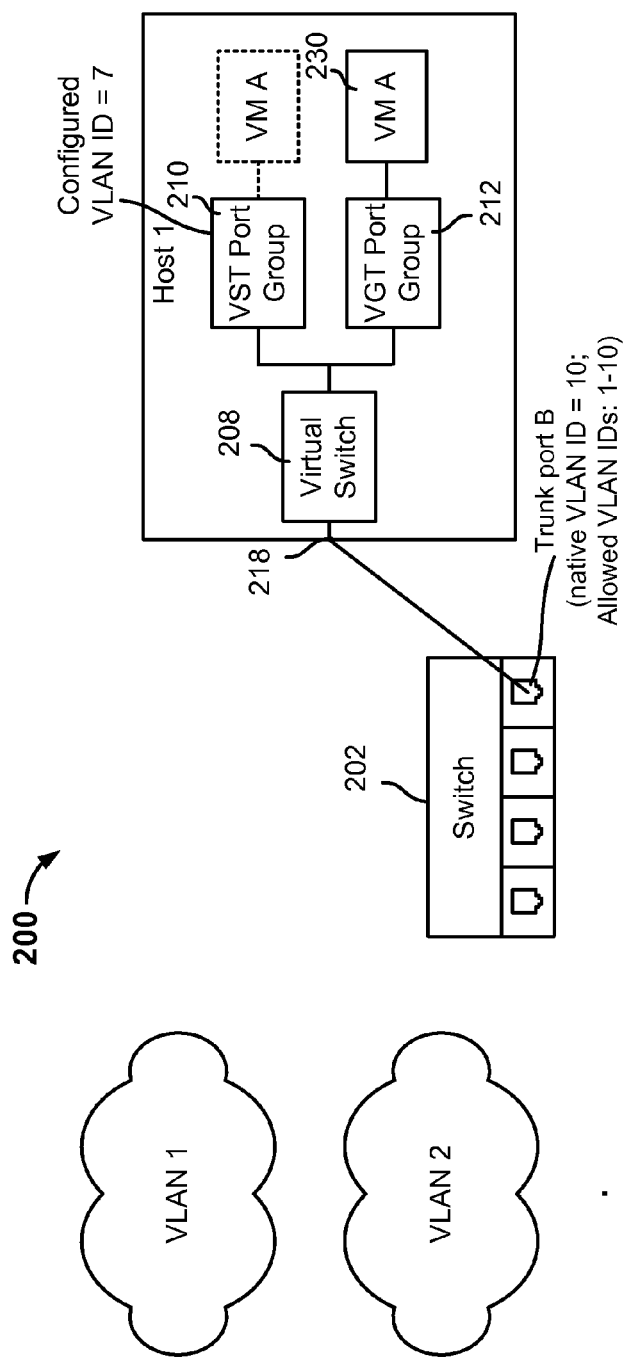
FIG. 2 is a diagram showing an example of a conventional virtual environment in which a VM is removed from being attached to a VST port group and then attached to a VGT port group.

However, the conventional network infrastructure that supports VLAN tagging does not adequately support VLAN tagging by a VM after the VM has been migrated to either a different type of virtual switch port group or a different host. FIG. 2, below, describes a first problem that arises when a VM is removed from being attached to a VST port group and then attached to a VGT port group and FIG. 3, below, describes a second problem that arises when a VM is migrated from a first host to a second host.

FIG. 2 is a diagram showing an example of a conventional virtual environment in which a VM is removed from being attached to a VST port group and then attached to a VGT port group. In system 200, assume that VM A 230 wants to communicate to another device that is located in VLAN 7 (not shown). VM A 230 was previously attached to VST port group 210 of virtual switch 208 of Host 1 and is now attached (e.g., by a hypervisor) to VGT port group 212 of virtual switch 208 of Host 1. One example scenario in which VM A 230 would be transitioned from being attached to VST port group 210 to VGT port group 212 is that the owner of VM A desires to cause VM A 230 to become trunking capable and therefore capable of tagging its outgoing traffic. While VM A 230 was attached to VST port group 210, VM A 230 was limited to operating in "access" mode and so did not tag the traffic that it sent out but had relied on VST port group 210 to tag the traffic with a VLAN ID configured for VST port group 210. Because VM A 230 wants to send traffic to VLAN 7, VM A 230 was attached to a VST port group with a configured VLAN of 7, VST port group 210. Traffic from VM A 230 tagged with VLAN 7 was then sent from interface 218 of Host 1 to trunk port B of physical switch 202. Trunk port B determined that the traffic was tagged with VLAN 7, checked that VLAN 7 was within its configured allowed VLAN ID range of 1-10, and subsequently passed the traffic to VLAN 7.

While VM A 230 was attached to VST port group 210, VM A 230 was not trunking capable. In this example, VM A 230 was transitioned from VST port group 210 to VGT port group 212 because the administrator of VM A 230 wanted to provide VM A 230 with trunking capability (i.e., the ability for VM A to tag its own outgoing traffic). Whereas when VM A 230 was connected to VST port group 210, VM A 230 was limited to sending traffic to only VLAN 7, but after VM A 230 has been migrated to VGT port group 212, VM A 230 could now potentially send traffic to multiple VLANs by being able to tag its own outgoing traffic with different VLAN IDs.

A problem may arise after VM A 230 is attached to VGT port group 212 if VM A 230 is not yet configured to operate in "trunk" mode and assigned a VLAN ID to which to send traffic. In this case, after VM A 230 is attached to VGT port group 212, VM A 230 would remain in "access" mode by default, even though VM A 230 is trunking capable, and therefore not tag its outgoing traffic. VM A 230 could be thought of as being capable of tagging its outgoing traffic but not yet configured (e.g., by the administrator of VM A 230) to perform such tagging. As such, after VM A 230 is attached to VGT port group 212 but remains in "access" mode, because conventionally VM A 230 is not aware of the underlying physical hardware of its computing environment, VM A 230 continues to send untagged traffic. Because VGT port group 212 does not tag received traffic, VGT port group 212 will send VM A 230's untagged traffic from interface 218 of Host 1 to trunk port B of physical switch 202. Trunk port B will determine that the traffic is untagged and will therefore send the traffic to its configured native VLAN ID, VLAN 10, which is not the VLAN ID (VLAN 7) to which VM A 230 had intended to send traffic. As a result, in a conventional virtual environment, the inconsistent behavior between a VST port group and a VGT port group may cause the flow of traffic sent from a VM to its intended VLAN to break after the VM is transitioned from a VST port group to a VGT port group.

Figure 3:
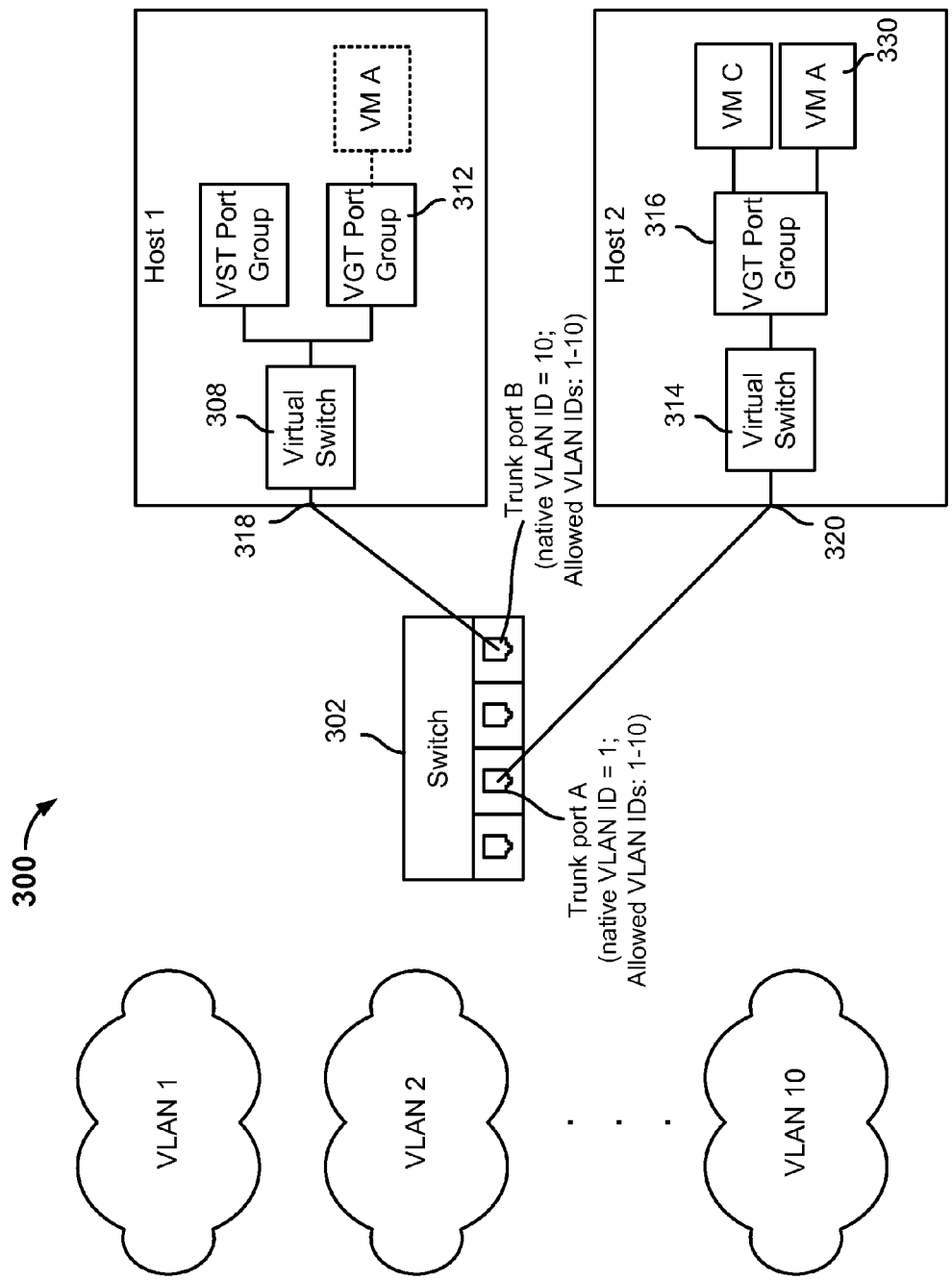
FIG. 3 is a diagram showing an example of a conventional virtual environment in which a VM is removed from being attached to a virtual switch VGT port group of a first host and then attached to a virtual switch VGT port group of a second host.

FIG. 3 is a diagram showing an example of a conventional virtual environment in which a VM is removed from being attached to a virtual switch VGT port group of a first host and then attached to a virtual switch VGT port group of a second host. In system 300, assume that VM A 330 wants to communicate to another device that is located in VLAN 1. VM A 330 was previously attached to VGT port group 312 of virtual switch 308 of Host 1 and is now attached (e.g., by a hypervisor) to VGT port group 316 of virtual switch 314 of Host 2. One example scenario in which VM A 330 would be migrated from Host 1 to Host 2 is to accommodate workload balancing, hardware failover, and/or computing requirements of the environment. Assume that in this example, while VM A 330 was attached to VGT port group 312, trunking capable VM A 330 was configured to be in "trunk" mode and also assigned to send traffic to VLAN 1. Therefore, in this example, while VM A 330 was attached to VGT port group 312, VM A 330 had tagged the traffic that it sent out with VLAN 1. Traffic from VM A 330 tagged with VLAN 1 was then sent from interface 318 of Host 1 to trunk port B of physical switch 302. Trunk port B determined that the traffic was tagged with VLAN 1, checked that VLAN 1 was within its configured allowed VLAN ID range of 1-10, and subsequently passed the traffic to VLAN 1.

In this example, VM A 330 was transitioned from VGT port group 312 of virtual switch 308 of Host 1 and is now attached (e.g., by a hypervisor) to VGT port group 316 of virtual switch 314 of Host 2 because maintenance needed to be made to Host 1.

A problem may arise after VM A 330 is migrated from the VGT port group of one host to the VGT port group of another host if the native VLAN ID of the physical trunk port connected to the first host interface differs from the native VLAN ID of the physical trunk port connected to the second host interface. When VM A 330 was attached to VGT port group 312 of virtual switch 308 of Host 1, the tagged traffic of VM A 330 was sent from interface 318 of Host 1 to trunk port B of physical switch 302, which is associated with the native VLAN ID of VLAN 10. After VM A 330 was attached to VGT port group 316 of virtual switch 314 of Host 2, the tagged traffic of VM A 330 will be sent from interface 320 of Host 2 to trunk port A of physical switch 302, which is associated with the native VLAN ID of VLAN 1, the same VLAN ID that is assigned to trunking capable VM A 330 to use in VLAN tagging in "trunk" mode. As mentioned above, a physical switch trunk port will drop received frames tagged with VLAN IDs equal to its configured native VLAN ID. Because, conventionally, VM A 330 is not aware of the underlying physical hardware of its computing environment, VM A 330 is not aware that a change had occurred in the infrastructure (i.e., VM A 330 has been migrated from the VGT port group of one host to the VGT port group of another host) or of the new native VLAN ID configured for trunk port B connected to the interface of the new host to which VM A 330 has been migrated, VM A 330 will continue to tag its outgoing traffic with VLAN 1. Trunk port B will determine that the traffic is tagged with the VLAN ID equal to its native VLAN ID and therefore drop such traffic and prevent the traffic from reaching intended VLAN ID. As a result, in a conventional virtual environment, the native VLAN IDs configured for physical switch trunk ports may cause the flow of traffic sent from a VM to its intended VLAN to break after the VM is migrated from one host to another.

Embodiments of VLAN tagging in a virtual environment are described herein. In various embodiments, a "virtual network device" comprises one or more virtual machines (VMs) configured to perform one or more network services, such as a firewall, a load balancer, a virtual private network, and an intrusion detection system. Virtual network devices can be provisioned, configured to perform a particular service, and added to a network topology. A virtual network device may be configured to communicate with another device placed in a different VLAN. In various embodiments, a set of VLAN tagging parameters are configured for each virtual network device. As will be described in further detail below, the virtual network device is configured to use the set of VLAN tagging parameters to perform VLAN tagging in a way that provides undisrupted traffic flow to the correct VLAN regardless of whether the virtual network device is transitioned from a VST port group to a VGT port group and/or the virtual network device has been migrated to a new host, such as in the scenarios described above.

Figure 4:
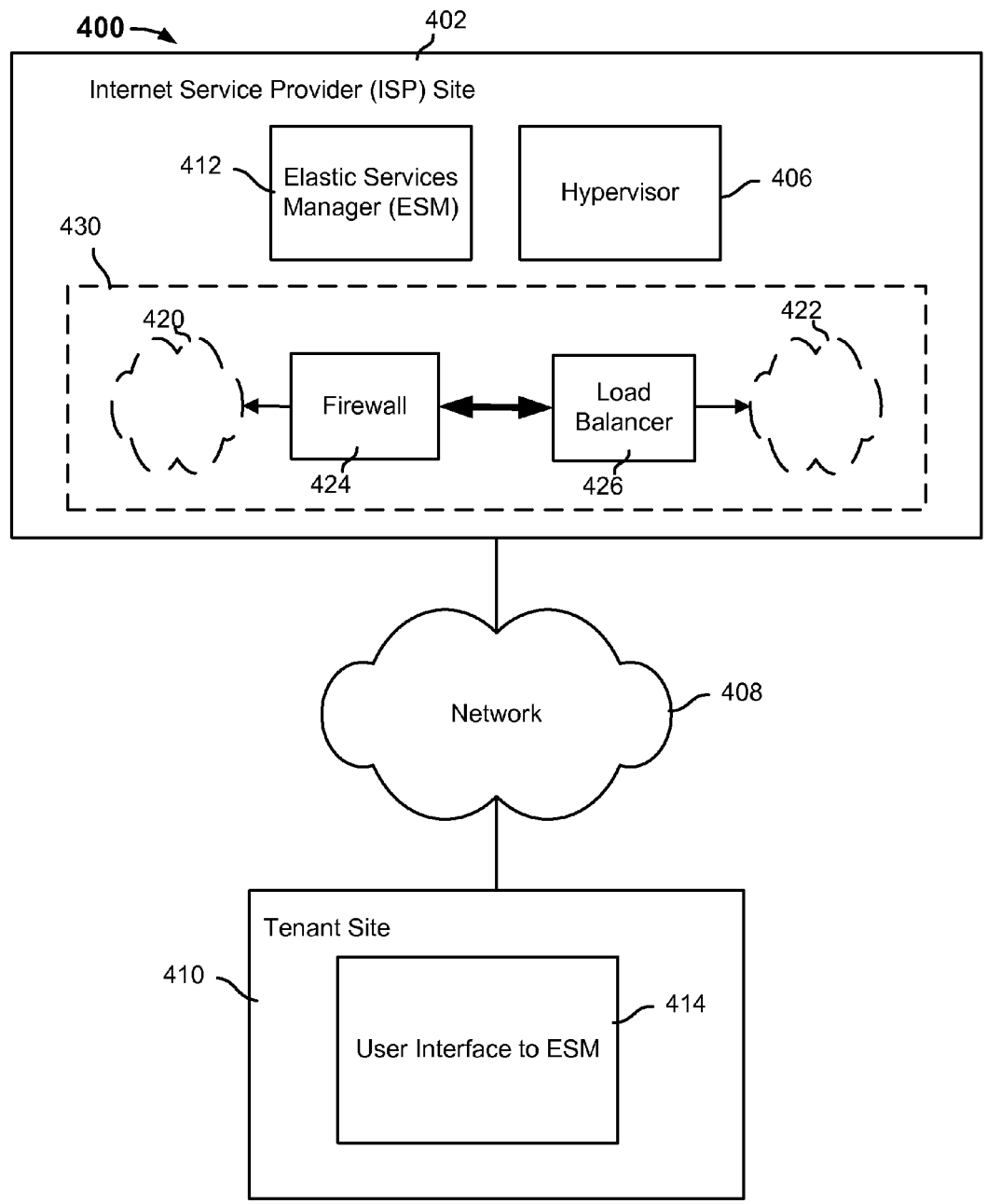
FIG. 4 is a diagram showing a system of performing VLAN tagging in a virtual environment in accordance with some embodiments.

FIG. 4 is a diagram showing a system of performing VLAN tagging in a virtual environment in accordance with some embodiments.

Elastic services manager (ESM) 412 is configured to provision and manage virtual network devices. ESM 412 may be implemented using software and/or hardware. In some embodiments, ESM 412 maintains data that tracks a pool of physical and/or logical resources that are available to use to create virtual network devices. For example, ESM 412 receives a request to provision two virtual network devices that can communicate to each other for a particular user. For example, each requested virtual network device is requested to perform a particular network service and to be placed in a particular VLAN. For example, the request may be input into a user interface to ESM and/or virtual network devices 414 and sent over network 408 to ESM 412. In response to the request, ESM 412 is configured to check whether the physical and/or logical resources required to provision the two requested virtual network devices in the requested VLANs are available (e.g., using its stored data) and in the event that the required resources are available, ESM 412 is configured to send a request to hypervisor 406 (and in some embodiments, in addition to one or more other hypervisors that are not shown in the diagram) to allocate the virtual machines for the requested virtual network devices. An example of hypervisor 406 is VMware ESXi. ESM 412 then configures the one or more virtual machines allocated by hypervisor 406 for each of the two requested network services to create the two virtual network devices. ESM 412 is configured to place the two virtual network devices in their respective VLANs and provide the two virtual network devices to the appropriate user of the virtual network devices. The user can configure the first and second virtual network devices such that traffic may flow between them across the different VLANs.

In some embodiments, ESM 412 is administered by an ESM administrator. For example, the ESM administrator is a user that manipulates the ESM by calling the ESM's (e.g., REST) APIs either directly or through a user interface and/or command-line interface.

In some embodiments, a virtual network device supports two management roles. The first role is called the "provisioning administrator," and is operated by an ESM (or other orchestration tool) on behalf of the ESM (or other orchestration tool) administrator. The provisioning administrator is associated with provisioning the virtual network services and managing the infrastructure of the network. The second role is called the virtual network device administrator. The virtual network device administrator is associated with the user of the virtual network device and whose traffic will be processed by the virtual network device. The provisioning administrator can enforce policies that the virtual network device administrator cannot override. The provisioning administrator is not the ESM administrator (i.e., the ESM administrator cannot use his/her credentials to control the virtual network devices automatically). The provisioning administrator can be thought of rather as a (non-user) proxy for the ESM to do something on a virtual network device (via using the provisioning administrator's credentials) in a way that cannot be undone by the virtual network device administrator. For example, the ESM administrator may configure the ESM, and as a result of this, the ESM might configure a virtual network device using the provisioning administrator credentials. Therefore, actions of the provisioning administrator are originally triggered by something the ESM administrator has done (either directly or through some other configuration items that were provided some time before). But to reiterate, the ESM administrator does not have access to the virtual network device directly—the only way he/she can act on the virtual network device is indirectly, as mediated by the ESM. As an example, the provisioning administrator (e.g., based on direction from an ESM) also provides a virtual network device name, a virtual network device management address, a high-availability configuration, etc.

The example of FIG. 4 shows performing VLAN tagging in a virtual environment for a particular tenant in a multitenancy scenario. In the example of FIG. 4, the multitenancy is provided by an internet service provider (ISP) for one or more customers (one or more tenants) of the ISP, though only one such tenant (the tenant associated with tenant site 410) is shown in the diagram. For example, a tenant may comprise an enterprise. A tenant may pay the ISP for its services and also may own or rent a set of resources inside the data center/network of the ISP site. In addition to owning or renting resources at the ISP site, the tenant may also own or rent resources at its own premises.

In this multitenancy scenario, the ISP is associated with provisioning the virtual network services and managing the infrastructure of the network and is therefore associated with the role of the ESM/provisioning administrator. In such a scenario, the tenant is a user of the virtual network device(s) and whose traffic will be processed by the virtual network device(s) and is therefore associated with the role of the virtual network device administrator. In various examples used herein, the ESM/provisioning administrator role is associated with a provider and the virtual network device administrator is associated with a tenant/user of the virtual network device. As will be described below, the ESM/provisioning administrator may configure a set of VLAN tagging parameters for a virtual network device in a manner transparent to the virtual network device administrator.

When a virtual network device administrator requests for ESM 412 to provision a virtual network device, the user may indicate whether the virtual network device is to be not trunking capable (e.g., limited to being configured in "access" mode) or trunking capable (e.g., able to be configured in either "access" mode or "trunk" mode). In the event that the virtual network device is requested to be trunking capable, ESM 412 will attach the virtual network device to a virtual switch VGT port group. When a virtual network device is attached to a VGT port group and is trunking capable, it may be configured to be in the "access" mode or the "trunk" mode by the virtual network device administrator. Otherwise, in the event that the virtual network device is requested to not be trunking capable, ESM 412 will attach the virtual network device to a virtual switch VST port and the virtual network device is limited to operating in only "access" mode. As will be described below, after attaching a virtual network device to a VST port group, the virtual network device administrator may later request ESM 412 to migrate the virtual network device to a VGT port group to gain the trunking capability.

ESM 412 stores data that describes the physical configuration of the network, which is typically transparent to a virtual network device, including which host interface is connected to which physical switch trunk port, which native VLAN ID is configured for each physical switch trunk port, which virtual network device is running on which host, and what is the allowed range of VLAN IDs configured for each physical switch trunk port. ESM 412 also stores data that describes the virtual configuration of the network such as whether a virtual network device is attached to a VST port group or a VGT port group and which VLAN ID has been configured for each VST port group. As will be further described below, ESM 412 (e.g., via the provisioning administrator) is configured to generate and update various VLAN related configurations for each virtual network device based on its stored physical and virtual configuration data. The VLAN related configurations stored for each virtual network device include a set of VLAN tagging parameters associated with each virtual network device such that the virtual network device can use its corresponding set of VLAN tagging parameters to correctly determine how to tag (including under which circumstances to not tag) the traffic that it sends to the virtual switch so that the traffic will be handled correctly by the corresponding physical switch port and therefore sent to the correct VLAN associated with the destination (e.g., virtual network) device.

As will be further described below, through configuring and/or updating the set of VLAN tagging parameters associated with a virtual network device, ESM 412 is enabled to ensure that traffic tagged by a trunking capable virtual network device flows to the correct VLAN after ESM 412 (e.g., via the provisioning administrator role) migrates the virtual network device from one host to another. Furthermore, through configuring and/or updating the set of VLAN tagging parameters associated with a virtual network device, ESM 412 is enabled to ensure that traffic flows to the correct VLAN after ESM 412 (e.g., via the provisioning administrator role) transitions a virtual network device from a VST port group to a VGT port group. In various embodiments, each virtual network device provisioned by ESM 412 is configured to include a software module that is configured to use the set of VLAN tagging parameters to determine whether/how to tag an outgoing frame. In some embodiments, such a software module executing on a virtual machine is referred to as an "interface manager." In various embodiments, ESM 412 maintains and updates each virtual network device's corresponding set of VLAN tagging parameters in a manner that is transparent to the virtual network device's administrator. The combination of updating of the set of VLAN tagging parameters for a virtual network device by an ESM and the usage of the set of VLAN tagging parameters by the virtual network device to tag its outgoing traffic enables the consistent flow of traffic from the virtual network device, without requiring intervention of a virtual network device administrator.

In the example, system 400 includes ISP site 402, network 408, and tenant site 410. In various embodiments, ISP site 402 and tenant site 410 are different physical sites. In the example, ESM 412 and hypervisor 406 are installed on-site at ISP site 402. ISP site 402 may include one or more other ESMs besides ESM 412. Each ESM installed at ISP site 402 is logically connected to the physical resources that it manages. The ISP of ISP site 402 has created a layer two and/or three topology that is shared among at least some tenants, including the tenant of tenant site 410. As will be described below, ISP site 402 also includes set of resources 430 (network node(s) 420, firewall 424, load balancer 426, and network node(s) 422) that is owned/rented by the tenant associated with tenant site 410. ISP site 402 may also include resources owned/rented by tenants other than the tenant of tenant site 410 that are not shown in FIG. 4. In the example, tenant site 410 includes user interface to ESM and/or virtual network devices 414, which comprises a user interface through which a user (e.g., a virtual network device administrator) at tenant site 410 can access ESM 412 installed at ISP site 402 and/or virtual network devices (e.g., firewall 424 and load balancer 426) that are owned/used by the tenant.

The following is an example of how ESM 412 at ISP site 402 may provision two virtual network devices (firewall 424 and load balancer 426) and place them in different VLANs for the tenant of tenant site 410:

For example, the tenant of tenant site 410 may wish to add a firewall virtual network device followed by a load balancer virtual network device to its topology. To do so, a user (e.g., an administrator of a virtual network device) of tenant site 410 may use user interface to ESM 414 to send a request to ESM 412 at ISP site 402 for a firewall virtual network device that is connected to a load balancer virtual network device. In some embodiments, user interface to ESM 414 comprises a client running the command line interface (CLI), or a set of REST commands, and/or a graphical user interface that accesses ESM 412 via a REST interface and a graphical interface (e.g., running as a web application) and/or a command-line interface (e.g., running as a Python application). The request may also include other information such as, for example, how many interfaces each of the firewall and load balancer is to have and which interface of each of the firewall and load balancer is to be used to exchange data with each other.

After receiving the request from user interface to ESM 414, ESM 412 checks its resource pool to determine whether the physical and/or logical resources required to create the requested virtual network devices are available. In the event that the resources are available, ESM 412 sends a request to hypervisor 406 to provision the appropriate number of virtual machines to be configured into the requested firewall and load balancer virtual network devices. ESM 412 then pushes configuration information down to the virtual network devices provisioned by hypervisor 406. ESM 412 itself and/or via the provisioning administrator role with respect to the virtual network devices of the tenant of tenant 410 sends configuration information to configure the virtual network devices as firewall 424 and load balancer 426. The virtual network device administrator at tenant site 410 can configure firewall 424 and load balancer 426 such that data may be exchanged between the two virtual network devices. In some embodiments, over time, firewall 424 and/or load balancer 426 may report data back to ESM 412.

Firewall 424 and load balancer 426, owned or rented by the tenant of tenant site 410, may each be running on a different host (e.g., server) and each host may be placed in a different VLAN. As such, different tenants of the same ISP may be allowed to use a different subset of all the VLANs managed by the ISP of ISP site 402. Each of the hosts on which firewall 424 and load balancer 426 run may be connected to a different trunk port of a physical switch. Each trunk port of the physical switch is associated with a configured native VLAN ID. In order for firewall 424 to send traffic back and forth with load balancer 426 in their respective VLANs, a software module (e.g., an interface manager) running on each of firewall 424 and load balancer 426 is configured to determine how to tag a frame that it sends based at least in part on the respective set of VLAN tagging parameters that the virtual network device has received from ESM 412.

Figure 5:
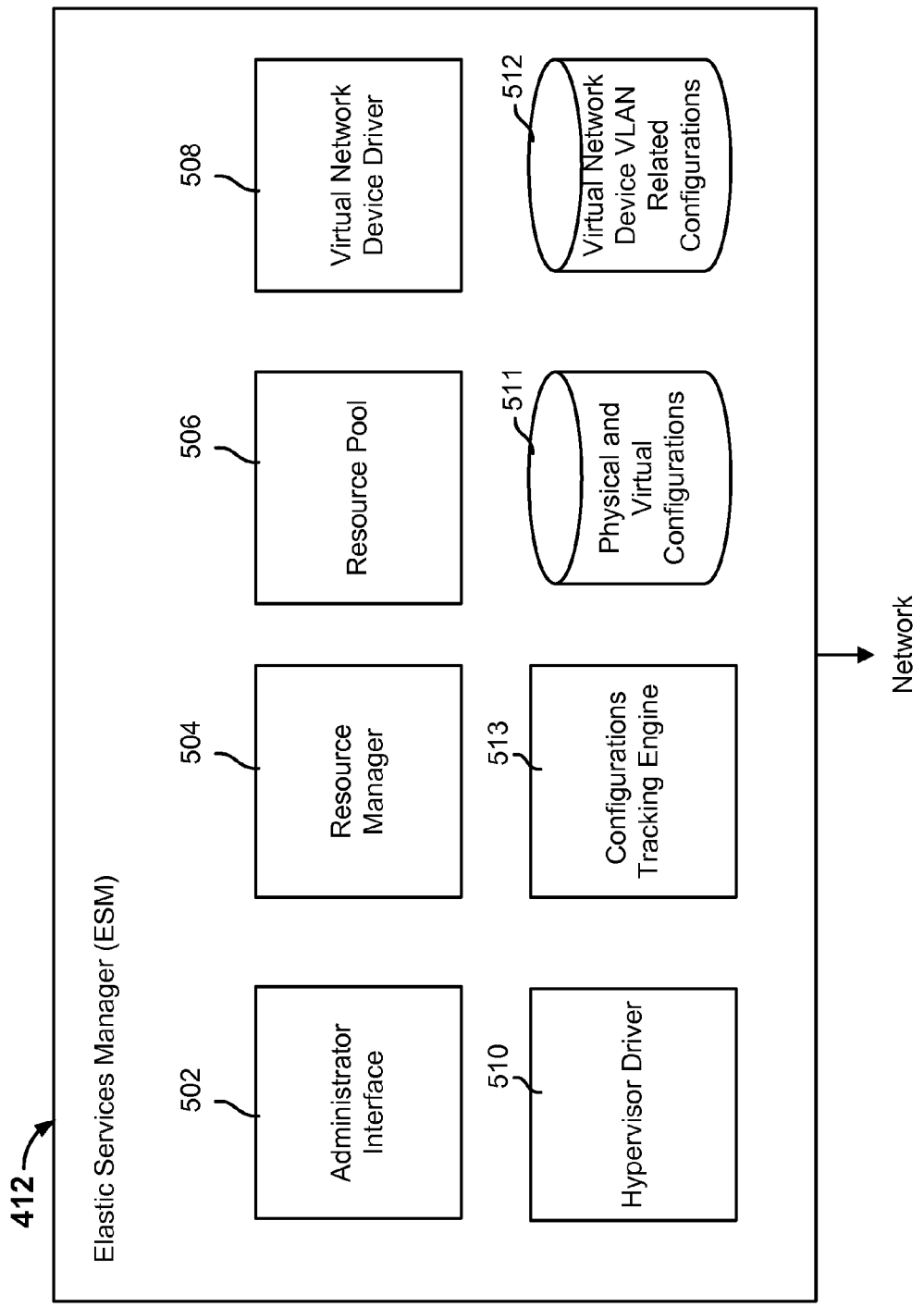
FIG. 5 is a diagram showing an example of an elastic services manager (ESM) in accordance with some embodiments.

FIG. 5 is a diagram showing an example of an elastic services manager (ESM) in accordance with some embodiments. In some embodiments, ESM 412 of system 400 of FIG. 4 may be implemented as the example described in FIG. 5. In the example, the ESM includes administrator interface 502, resource manager 504, resource pool 506, virtual network device driver 508, hypervisor driver 510, configurations tracking engine 513, physical and virtual configurations storage 511, and virtual network device VLAN related configurations storage 512. Each of administrator interface 502, resource manager 504, resource pool 506, virtual network device driver 508, configurations tracking engine 513, and hypervisor driver 510 may be implemented using software and/or hardware.

Administrator interface 502 is configured to receive input from users (e.g., an ESM administrator). For example, administrator interface 502 is configured to provide a local or remote user interface through which a user may input information. In some embodiments, the user inputs are received via a Representational State Transfer (REST) application programming interface (API). In some embodiments, administrator interface 502 receives a request to provision one or more virtual network devices. For example, the request may be made by a tenant in a multitenancy (e.g., a customer of an ISP) scenario. For example, the request may include information associated with the number of requested virtual network devices, a number of interfaces of each virtual network device, a network service (e.g., firewall, load balancing, or other network service) to be performed by each virtual network device, a VLAN on which to place each virtual network device, and a particular user (e.g., tenant) to which the virtual network devices are to be allocated. Administrator interface 502 is also configured to translate the request, if needed, and forward (the translated) request to resource manager 504.

Resource manager 504 is configured to receive requests for provisioning virtual network devices forwarded by administrator interface 502. In some embodiments, resource manager 504 is a component of one specific ESM, rather than of multiple ESMs. Resource manager 504 is configured to determine which physical resources and/or logical resources are needed to service each request. Resource pool 506 is configured to maintain updated data associated with the physical and/or logical resources that are available (e.g., to use to generate new virtual network devices) and that are unavailable (e.g., unavailable resources may include resources that have already been assigned to existing virtual network devices). Examples of physical and/or logical resources tracked by resource pool 506 include physical servers (hosts), central processing units (CPUs), memory, network interface cards, VLAN IDs, IP addresses, and sets of network addresses. In some embodiments, resource manager 504 is configured to check with resource pool 506 to determine whether the physical and/or logical resources required to process each request are available. In the event that resource pool 506, internal to the ESM, informs resource manager 504, internal to the ESM, that the resources required to process a request are available, resource manager 504 is configured to send a message including the request to hypervisor driver 510, internal to the ESM, to be passed (e.g., over a network) to a hypervisor (not shown in FIG. 5) that is external to the ESM. In some embodiments, the message sent to hypervisor driver 510 may include the original request for one or more virtual network devices and also additional specifications for the virtual network devices such as, for example, which and/or how much of each resource to use to provision each virtual network device.

Hypervisor driver 510 is configured to translate messages from the ESM to a format that can be understood by a hypervisor (that is external to the ESM) and to send the translated messages to the hypervisor. In some embodiments, hypervisor driver 510 is configured to receive messages and translate messages from resource manager 504 and send the translated messages to the hypervisor (e.g., via a REST or proprietary API). The hypervisor will generate the appropriate number of virtual machines for each requested virtual network device and will also create or reconfigure other network resources that each virtual machine is attached to (e.g., virtual switches).

Virtual network device driver 508 is configured to translate directives from the ESM into directives that can be understood by a virtual network device, which comprises one or more virtual machines. After the virtual machine(s) are provisioned by the hypervisor, virtual network device driver 508 is configured to send translated directives to the virtual network devices to configure such one or more virtual machines to serve as each requested virtual network device. The translated directives sent to the virtual network devices (e.g., via a REST API) may include, for example, the network service(s) to be performed by each virtual network device.

Physical and virtual configurations storage 511 is configured to store data related to the physical and virtual infrastructure managed by the ESM. In some embodiments, physical and virtual configurations storage 511 is configured to store physical configurations such as, for example, one or more of the following: which host interface is connected to which physical switch trunk port, which native VLAN ID is configured for each physical switch trunk port, which virtual network device is running on which host, and what is the allowed range of VLAN IDs configured for each physical switch trunk port. In some embodiments, physical and virtual configurations storage 511 is configured to store virtual configurations such as, for example, one or more of the following: whether a virtual network device is attached to a VST port group or a VGT port group and which VLAN ID has been configured for each VST port group.

Configurations tracking engine 513 is configured to determine whether a physical and/or virtual configuration has changed in the virtual environment associated with the ESM. In some embodiments, configurations tracking engine 513 determines a change in a physical and/or virtual configuration and updates physical and virtual configurations storage 511. For example, configurations tracking engine 513 determines whether a virtual network device has been removed from a VST port group and attached to a VGT port group. In another example, configurations tracking engine 513 determines whether a virtual network device has been migrated from one host to another host. In some embodiments, configurations tracking engine 513 is configured to use the data stored at physical and virtual configurations storage 511 to determine a set of VLAN related configurations stored for each virtual network device and store such configurations at virtual network device VLAN related configurations storage 512. Configurations tracking engine 513 is configured to send the set of VLAN related configurations stored for each virtual network device to that virtual network device (via the provisioning administrator). After configurations tracking engine 513 determines a change to a physical and/or virtual configuration and updates physical and virtual configuration storage 511 accordingly, configurations tracking engine 513 may also update one or more sets of VLAN related configurations stored at virtual network device VLAN related configurations storage 512 and then send the updated sets of VLAN related configurations to the respective virtual network devices. A set of VLAN related configurations stored for each virtual network device comprises information that pertains to the VLAN tagging that is to be performed by that virtual network device. In some embodiments, the set of VLAN related configurations stored for each virtual network device further includes a set of VLAN tagging parameters. In some embodiments, the VLAN tagging parameters stored for a virtual network device include whether the virtual network device is trunking capable (e.g., whether the virtual network device is attached to a VGT port group), a floating native VLAN ID, allowed VLANs, and a default VLAN ID. As will be described further below, the parameter describing whether the virtual network device is trunking capable is determined based on whether the virtual network device is attached by the provisioning administrator to a VST or a VGT port group, the floating native VLAN ID parameter is determined based on the native VLAN ID configured for the physical switch trunk port connected to the relevant interface of the current host on which the virtual network device is running, the allowed VLANs comprise a subset of VLAN IDs that are permitted (by the provisioning administrator) to be used by the user (e.g., tenant) associated with the virtual network device, and the default VLAN ID is selected by the provisioning administrator based on a set of criteria.

In various embodiments, configurations tracking engine 513 is configured to send the virtual network device its corresponding set of VLAN tagging parameters and updates thereof. Regardless of whether the virtual network device administrator has configured a trunking capable virtual network device (e.g., a virtual network device that is attached to a VGT port group) to be in either "access" or "trunk" mode, the virtual network device (e.g., a software module running on the virtual network device) is configured to perform VLAN tagging using its respective set of VLAN tagging parameters.

Figure 6:
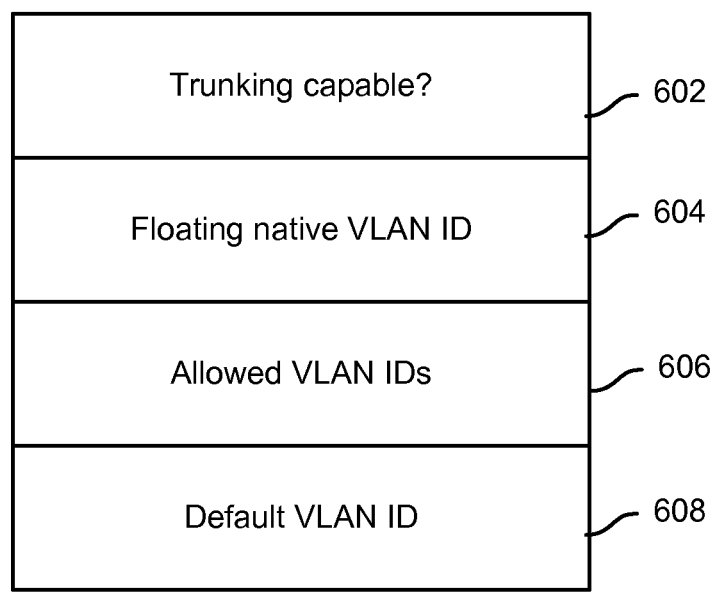
FIG. 6 is a diagram showing an example set of VLAN tagging parameters that can be stored for each virtual network device in accordance with some embodiments.

FIG. 6 is a diagram showing an example set of VLAN tagging parameters that can be stored for each virtual network device in accordance with some embodiments. In some embodiments, the set of VLAN tagging parameters for each virtual network device is stored and configured by the provisioning administrator. Set of VLAN tagging parameters 600 includes "trunking capable?" parameter 602, "floating native VLAN ID" parameter 604, "allowed VLAN IDs" parameter 606, and "default VLAN ID" parameter 608. However, set of VLAN tagging parameters 600 is merely an example and in actual implementation, different, fewer, and/or additional VLAN tagging parameters may be stored for each virtual network device.

"Trunking capable?" parameter 602 is set to "true" if the virtual network device is attached by the provisioning administrator to a VGT port group of a virtual switch and is set to "false" if the virtual network device is attached by the provisioning administrator to a VST port group of a virtual switch. In some embodiments, the provisioning administrator attaches a virtual network device to a VGT port group in the event that the virtual network device administrator had requested to the ESM that the virtual network device be trunking capable. In some embodiments, the provisioning administrator attaches a virtual network device to a VST port group in the event that the virtual network device administrator had requested to the ESM for the virtual network device to be exclusively in the "access" mode and therefore, not trunking capable. However, in some embodiments, after the provisioning administrator removes the virtual network device from a VST port group and attaches the virtual network device to a VGT port group, the "trunking capable?" parameter 602 for the virtual network device is changed from "false" to "true." In various embodiments, a virtual network device whose "trunking capable?" parameter 602 is set to "true" is capable of being configured by the virtual network device to be in either "access" mode or "trunk" mode. In the event that the virtual network device's "trunking capable?" parameter 602 is set to "true" and regardless of whether the virtual network device has been configured by the virtual network device administrator to be in "access" or "trunk" mode, the virtual network device (e.g., or a software module running thereof) is configured to determine how to tag its outgoing traffic.

"Floating native VLAN ID" parameter 604 is set to the native VLAN ID configured for the physical switch trunk port connected to the relevant interface of the current host on which the virtual network device is running. The value of "floating native VLAN ID" parameter 604 is updated in the event that the virtual network device is migrated to a new host. In the event that the virtual network device is migrated to a new host, the "floating native VLAN ID" parameter 604 is updated to the VLAN ID of the native VLAN ID configured for the physical switch trunk port connected to the relevant interface of the new host. In various embodiments, a trunking capable virtual network device (e.g., or a software module running thereof) that is configured in either "access" or "trunk" mode is configured to use "floating native VLAN ID" parameter 604 to determine to not tag traffic destined for a VLAN ID that is the same as the floating native VLAN ID parameter 604 but to tag traffic destined for a VLAN ID that is not the same as the floating native VLAN ID parameter 604 with the destination VLAN ID.

"Allowed VLAN IDs" parameter 606 is set to the subset of VLAN IDs with which the virtual network device may pass traffic. In various embodiments, the VLAN IDs of the "allowed VLAN IDs" parameter 606 are set to the VLAN IDs for which the tenant who uses the virtual network device are permitted to use (e.g., via an arrangement with the service provider). In some embodiments, a trunking capable virtual network device (e.g., or a software module running thereof) is configured to use "allowed VLAN IDs" parameter 606 to determine which VLAN IDs that it can use to tag traffic. In some embodiments, the values of "allowed VLAN IDs" parameter 606 are selected by the provisioning administrator based on at least a subset of the allowed range/set of VLAN IDs configured for the physical switch trunk port that is connected to the relevant interface of the current host on which the virtual network device is running.

"Default VLAN ID" parameter 608 is set to a VLAN ID that is selected by the provisioning administrator. In some embodiments, a virtual network device (e.g., or a software module running thereof) is configured to use "default VLAN ID" parameter 608 to tag outgoing traffic when "trunking capable?" parameter 602 has been set to "true" (because the virtual network device has been attached to a VGT port group) but the virtual network device administrator has configured the virtual network device to operate in "access" mode. In some embodiments, a virtual network device (e.g., or a software module running thereof) is configured to use "default VLAN ID" parameter 608 to tag outgoing traffic when "trunking capable?" parameter 602 has been set to "true" (because the virtual network device has been attached to a VGT port group) and the virtual network device administrator has configured the virtual network device to operate in "trunk" mode but the virtual network device administrator has not yet assigned the virtual network device a VLAN ID to which to send traffic. In the event that the virtual network device has been transitioned from being attached to a VST port group to a VGT port group, "default VLAN ID" parameter 608 can be set to the VLAN ID configured for the VST port group so that the virtual network device (e.g., or a software module thereof) can emulate the VST port group after it has been transitioned to a VGT port group and configured in "access" mode or configured in "trunk" mode but not (yet) assigned a VLAN ID.

Figure 7:
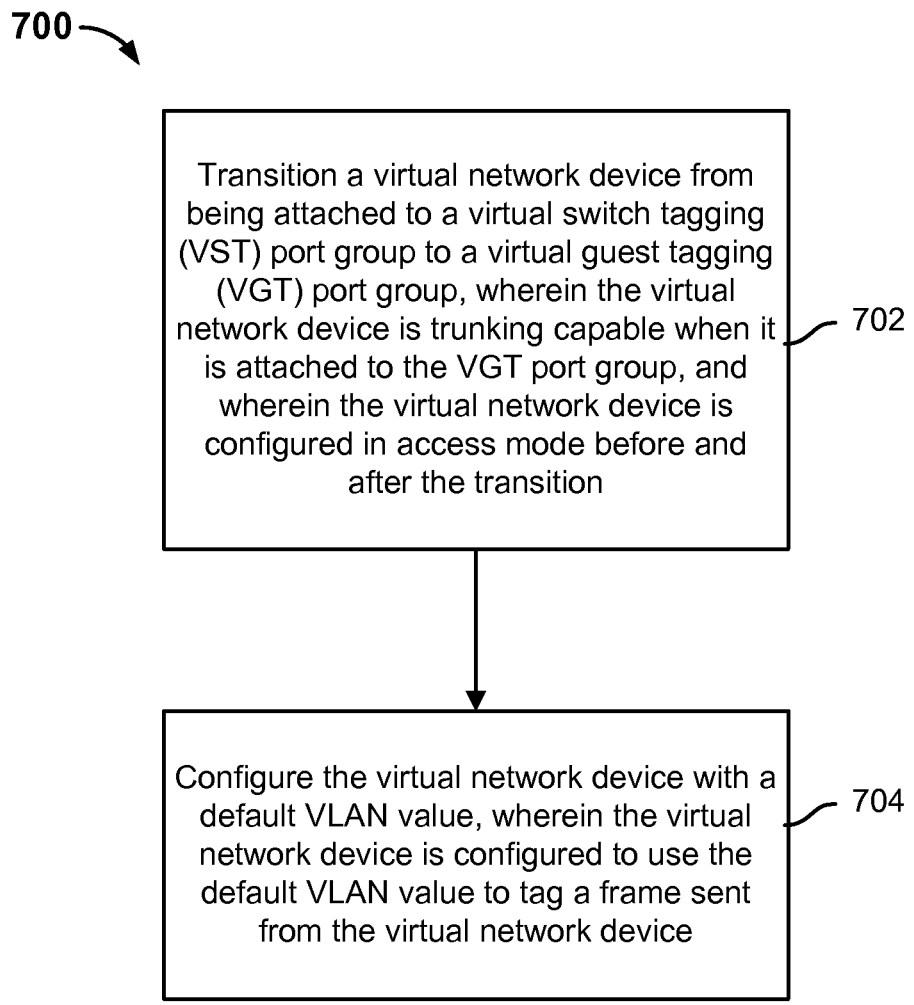
FIG. 7 is a flow diagram showing an embodiment of a process for configuring a virtual network device with a default VLAN value in accordance with some embodiments.

FIG. 7 is a flow diagram showing an embodiment of a process for configuring a virtual network device with a default VLAN value in accordance with some embodiments. In some embodiments, process 700 is implemented at a system such as system 400 of FIG. 4. In some embodiments, process 700 is implemented by an ESM and/or a provisioning administrator.

At 702, a virtual network device is transitioned from being attached to a virtual switch tagging (VST) port group to a virtual guest tagging (VGT) port group, wherein the virtual network device is trunking capable when it is attached to the VGT port group, and wherein the virtual network device is configured in access mode before and after the transition. In various embodiments, a virtual network device is not trunking capable when it is attached to a VST port group of a virtual switch. As described above, when a virtual network device is attached to a VST port group, the virtual network device is not trunking capable, is limited to operating in "access" mode, and does not tag its outgoing traffic. In various embodiments, the virtual network device becomes trunking capable when the ESM/provisioning administrator removes the virtual network device from being attached to a VST port group and instead attaches the virtual network device to a VGT port group. By virtue of being attached to the VGT port group, the virtual network device is now capable of performing tagging of its outgoing traffic. In some embodiments, a software module (the interface manager) running on the virtual network device is configured to perform tagging of the virtual network device's outgoing traffic after the virtual network device becomes trunking capable. In some embodiments, after the virtual network device is transitioned from a VST port group to a VGT port group, the virtual network device remains in "access" mode by default (because the virtual network device could have only operated in "access" mode while attached to the VST port group).

In some embodiments, the virtual network device becomes trunking capable from previously being not trunking capable due to a change in the service provided by the provider to the tenant associated with the virtual network device. The following is an example of a change in the service provided by the provider to the tenant: The tenant did not previously pay for a virtual network device of the tenant to be trunking capable and so, the provisioning administrator had attached the virtual network device to a VST port group. However, the tenant later decides to pay for the virtual network device to be trunking capable and so the provisioning administrator removes the virtual network device from a VST port group and attaches the virtual network device to a VGT port group.

At 704, the virtual network device is configured with a default VLAN value, wherein the virtual network device is configured to use the default VLAN value to tag a frame sent from the virtual network device. The VLAN tagging parameter of the default VLAN value (e.g., default VLAN ID) parameter is configured for and sent to the virtual network device. In various embodiments, the virtual network device (e.g., the interface manager thereof) will use the default VLAN value to tag its outgoing traffic in certain events. In some embodiments, the virtual network device will use the default VLAN value parameter to tag its outgoing traffic in the event that the virtual network device remains operating in "access" mode after it has been attached to a VGT port group. While the virtual network device was previously attached to the VST port group, the virtual network device had not tagged its outgoing traffic and had relied on the VST port group to tag the traffic with a VLAN value configured for the VST port group.

To allow a trunking capable but operating in "access" mode virtual network device to emulate the tagging behavior of the VST port group to which it was formerly attached, in some embodiments, the ESM/provisioning administrator can set the default VLAN value configured for the virtual network device to be equal to the VLAN value configured for the VST port group. That way, after transitioning from the VST port group to the VGT port group and remaining in the "access" mode, the virtual network device can continue to tag its outgoing traffic with the same VLAN value that was configured to be used in tagging by the VST port group. For example, if VLAN 5 has been configured to be used in tagging by the VST port group that the virtual network device was previously attached to, then the default VLAN value configured for the virtual network device may also be VLAN 5. In some embodiments, the default VLAN value can be configured to be any VLAN ID.

In some embodiments, other (updated) VLAN tagging parameters besides the default VLAN value are sent to the virtual network device. For example, other VLAN tagging parameters include one or more of the following: a "trunking capable" parameter that is set to "true," a set of allowed VLAN values comprising VLAN values that the tenant associated with the virtual network device is allowed to use, and a floating native VLAN value corresponding to the native VLAN value configured to the trunk port connected to the relevant interface of the host on which the virtual network device is currently running.

In various embodiments, after the virtual network device is attached to a VGT port group and remains in "access" mode, the interface manager of the trunking capable virtual network device will first determine whether the default VLAN value parameter is within the set of allowed VLAN values in the VLAN tagging parameters and also if the default VLAN value is not equal to the floating native VLAN value in the VLAN tagging parameters. In the event that the default VLAN value is within the set of allowed VLAN values and also not equal to the floating native VLAN value, the interface manager will tag an outgoing frame with the default VLAN value. Otherwise, in the event that the default VLAN value is not within the set of allowed VLAN values, the interface manager will not send the outgoing frame. Or, otherwise, in the event that the default VLAN value is within the set of allowed VLAN values but is also equal to the floating native VLAN value, then the interface manager will send an untagged outgoing frame.

Figure 8:
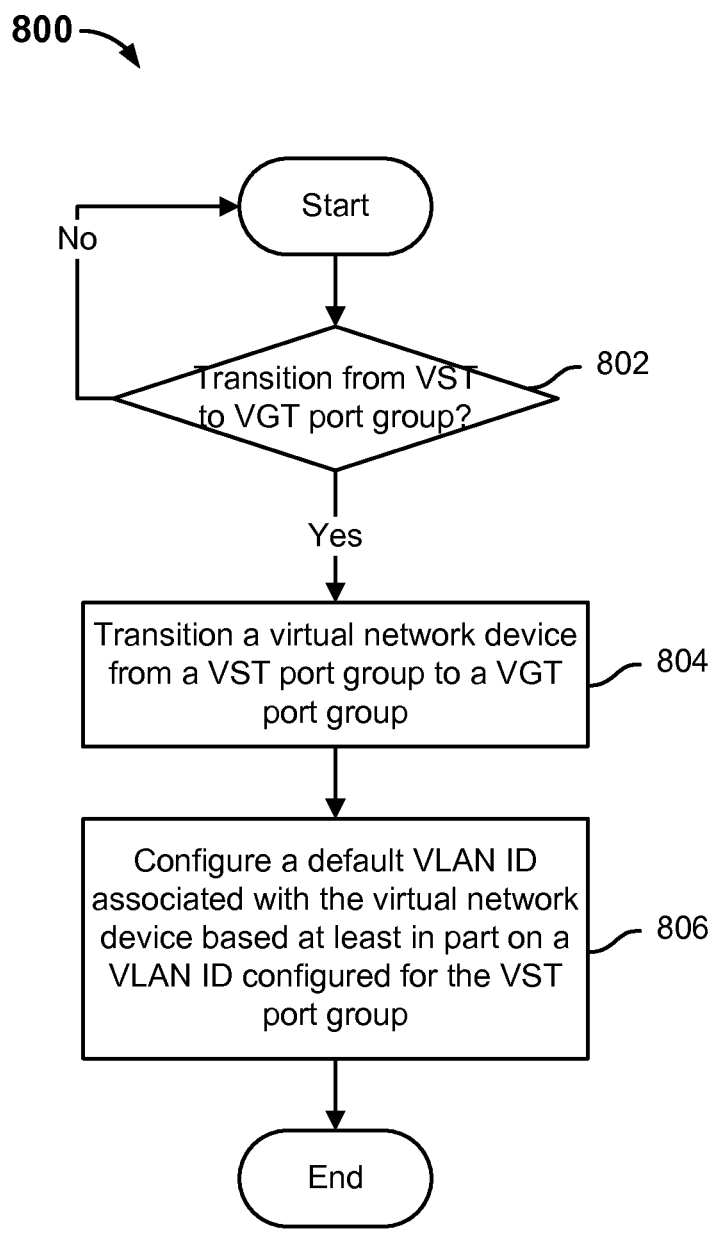
FIG. 8 is a flow diagram showing an example of a process for configuring a virtual network device with a default VLAN value in accordance with some embodiments.

FIG. 8 is a flow diagram showing an example of a process for configuring a virtual network device with a default VLAN value in accordance with some embodiments. In some embodiments, process 800 is implemented at a system such as system 400 of FIG. 4. In some embodiments, process 800 is implemented by an ESM and/or a provisioning administrator.

Process 800 shows an example process by which a virtual network device is transitioned from a VST port group to a VGT port group and a default VLAN ID configured for the virtual network device is equal to the VLAN ID configured for the VST port group to use in tagging packets to enable the now trunking capable virtual network device to continue tagging outgoing traffic in the same manner that the VST port group had.

At 802, it is determined whether a virtual network device is to be transitioned from a VST port group to a VGT port group. In the event that it is determined that the virtual network device is to be transitioned from the VST port group to a VGT port group, then control is transferred to 804. Otherwise, in the event that it is determined that the virtual network device is to remain attached to the VST port group, control returns to 802 at a later time. In some embodiments, the virtual network device is configured to be transitioned from a VST port group to a VGT port group in the event that a change is detected in the service provided by the service provider to the tenant associated with the virtual network device. For example, the tenant may have requested for the virtual network device to be upgraded in service and become trunking capable, where it was not previously trunking capable. At 804, a virtual network device is transitioned from a VST port group to a VGT port group. The ESM/provisioning administrator removes the virtual network device from being attached to a VST port group and instead attaches the virtual network device to a VGT port group. At 806, a default VLAN ID associated with the virtual network device is configured based at least in part on a VLAN ID configured for the VST port group. To allow a trunking capable but operating in "access" mode virtual network device to emulate the tagging behavior of the VST port group to which it was formerly attached, in some embodiments, the ESM/provisioning administrator can set the default VLAN value configured for the trunking capable virtual network device to be equal to the VLAN value configured for the VST port group. This way, when the trunking capable virtual network device is operating in "access" mode, the virtual network device (e.g., the interface manager thereof) can use the default VLAN ID to tag its outgoing frames without any interruption to its traffic after the transition.

Figure 9:
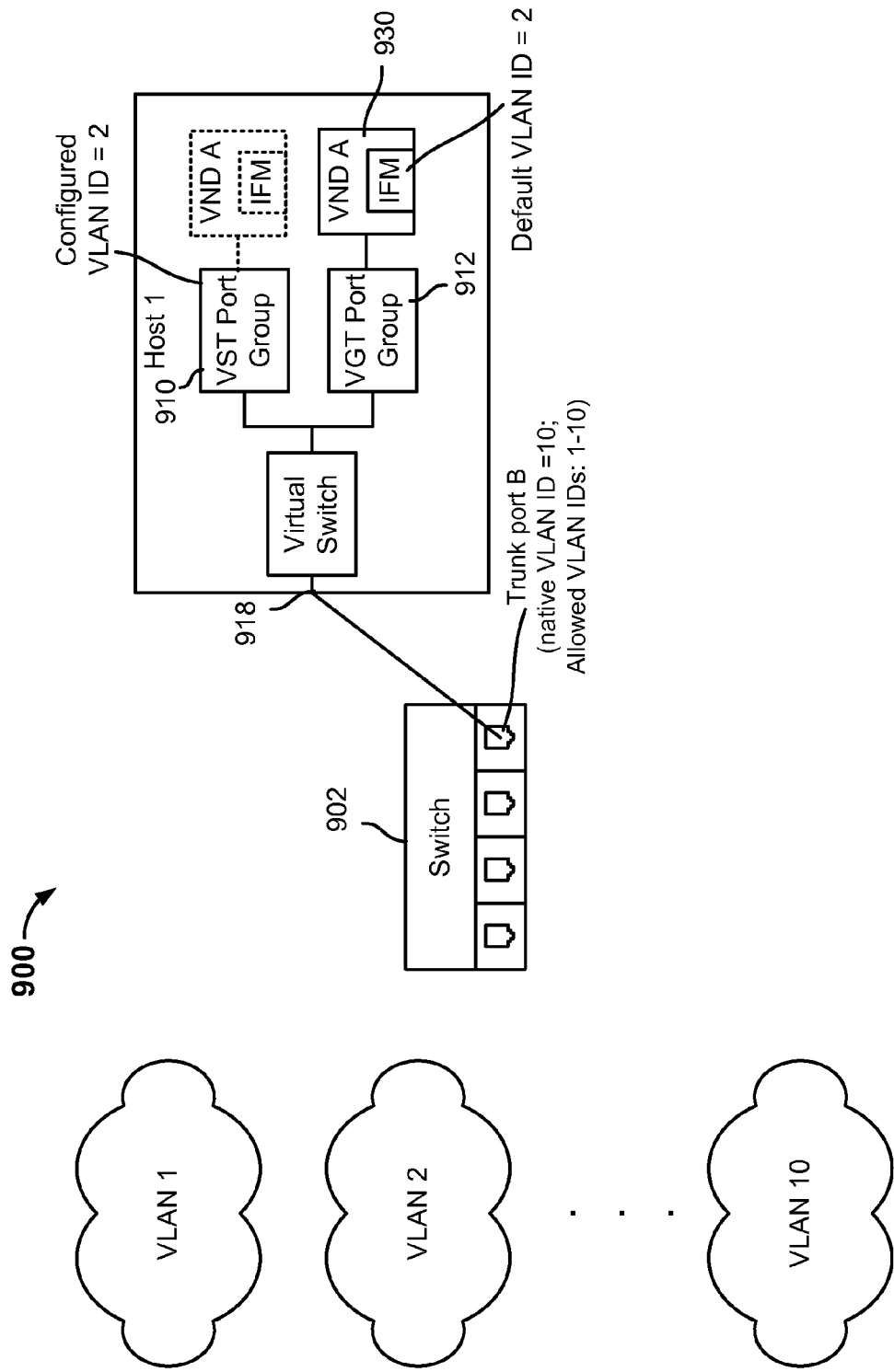
FIG. 9 is a diagram showing an example of a virtual environment in which a virtual network device with a default VLAN value is configured in accordance with some embodiments.

FIG. 9 is a diagram showing an example of a virtual environment in which a virtual network device with a default VLAN value is configured in accordance with some embodiments. In system 900, virtual network device A (VND A 930) wants to send traffic to a destination located in VLAN 2. VND A 930 was initially attached to VST port group 910 of Host 1. When VND A 930 was attached to VST port group 910, VND A 930 did not tag its outgoing traffic and VST port group 910 had tagged VND A 930's traffic using its configured VLAN ID, VLAN 2. As such, when VND A 930 was attached to VST port group 910, the traffic from VND A 930 was sent to VLAN 2. Then, in response to an event (e.g., a change in the service provided by the service provider to the tenant associated with VND A 930), VND A 930 was removed from VST port group 910 and then attached to VGT port group 912 of Host 1.

Conventionally, after being attached to VGT port group 912, VND A 930 would have remained in "access" mode and would have still not tagged its outgoing traffic. As a result, conventionally, the untagged traffic from VND A 930 would have passed through VGT port group 912, been sent out through interface 918 of Host 1, and received at trunk port B of physical switch 902. Conventionally, trunk port B of physical switch 902 would have considered the untagged traffic to be destined for its configured native VLAN ID of VLAN 10. As such, trunk port B would have sent the untagged traffic to VLAN 10, thereby breaking the traffic that should have been sent to VLAN 2.

However, according to embodiments described herein, a default VLAN ID is configured for VND A 930 equal to the VLAN ID (VLAN 2) configured for VST port group 910 after VND A 930 is transitioned to VGT port group 912 so that the interface manager (IFM) software module running on trunking capable VND A 930 can use the default VLAN 2 to tag its outgoing traffic so that the traffic can continue to be sent to VLAN 2 as if VND A 930 were still attached to VST port group 910. By configuring the default VLAN ID to be equal to the VLAN ID (VLAN 2) configured for VST port group 910 to which VND A 930 was previously attached, while VND A 930 is operating in "access" mode, VND A 930 can continue to send traffic to the correct VLAN ID despite the transition from being not trunking capable to being trunking capable.

After being transitioned to VGT port group 912, VND A 930 can be configured by the administrator of VND A 930 to switch from the "access" mode to "trunk" mode and to tag outgoing traffic based on an assigned VLAN ID (not shown in FIG. 9), in which case, VND A 930 will no longer tag its outgoing traffic with the default VLAN ID but start to tag its outgoing traffic with the assigned VLAN ID.

Figure 10:
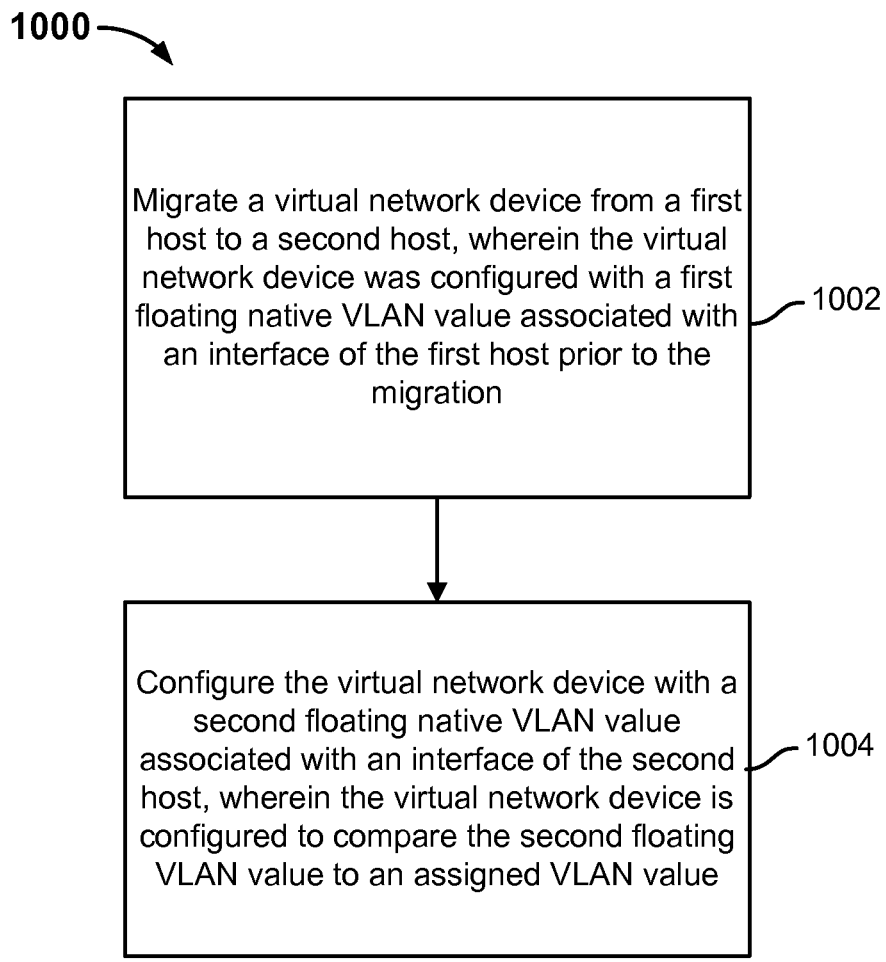
FIG. 10 is a flow diagram showing an embodiment of a process for migrating a virtual network device from a first host to a second host in accordance with some embodiments.

FIG. 10 is a flow diagram showing an embodiment of a process for migrating a virtual network device from a first host to a second host in accordance with some embodiments. In some embodiments, process 1000 is implemented at a system such as system 400 of FIG. 4. In some embodiments, process 1000 is implemented by an ESM and/or a provisioning administrator.

At 1002, a virtual network device is migrated from a first host to a second host, wherein the virtual network device was configured with a first floating native VLAN value associated with an interface of the first host prior to the migration. In various embodiments, a floating native VLAN value (e.g., floating native VLAN ID) parameter is set to the native VLAN value configured for the physical switch trunk port connected to the relevant interface of the current host on which the virtual network device is running A virtual network device may be migrated from a first host to a second host for various reasons. A first example reason is that the first host fails and so the virtual network device is migrated to an operational second host. A second example reason is that maintenance needs to be performed on the first host and so the virtual network device is migrated to a second host on which maintenance is not currently being performed. A third example reason is that the first host does not have additional resources (e.g., memory, processing capacity, storage, etc.) that are requested for the virtual network device and so the virtual network device is migrated to a second host that can provide the requested additional resources.

Prior to the migration, the virtual network device was running on the first host and was configured with a floating native VLAN value (e.g., floating native VLAN ID) parameter that is equal to the native VLAN value configured for the physical switch trunk port that is connected to the interface of the first host from which outgoing traffic from the virtual network device was sent. In various embodiments, the virtual network device was attached to a VGT port group at the first host prior to the migration and is attached to a VGT port group at the second host subsequent to the migration. Since the virtual network device was attached to the VGT port group at the first host, the virtual network device was trunking capable. In the event that the virtual network device was configured to operate in "trunk" mode and assigned a VLAN value to send traffic to by the virtual network device administrator while attached to the VGT port group of the first host, then the virtual network device had determined whether to tag an outgoing frame with the assigned VLAN value by first comparing it to the floating native VLAN value parameter determined based on the interface of the first host. In some embodiments, a software module (the interface manager) running on the virtual network device is configured to perform tagging of the virtual network device's outgoing traffic using at least the floating native VLAN value parameter. As described above, if a physical switch trunk port receives an untagged frame, then the trunk port will consider that the frame is implied to be sent to the native VLAN value configured for that trunk port but if the physical switch trunk port receives a frame tagged with the native VLAN value configured for that trunk port, then the trunk port may drop the frame. As such, the virtual network device is configured to first check whether its assigned VLAN value equals the floating native VLAN value parameter determined based on the interface of the first host. In the event that the assigned VLAN value equals the floating native VLAN value parameter determined based on the interface of the first host, then the virtual network device will not tag an outgoing frame and in the event that the assigned VLAN value does not equal the floating native VLAN value parameter determined based on the interface of the first host, then the virtual network device will tag an outgoing frame with the assigned VLAN value.

At 1004, the virtual network device is configured with a second floating native VLAN value associated with an interface of the second host, wherein the virtual network device is configured to compare the second floating VLAN value to an assigned VLAN value. After the migration, the virtual network device is running on the second host. This is because, conventionally, the virtual network device is unaware of the physical configuration of the environment including the native VLAN value configured for the physical switch trunk port that is connected to the interface of the second/new host from which outgoing traffic from the virtual network device will be sent. Therefore, conventionally, after being migrated to the second/new host, the virtual network device might have still compared its assigned VLAN value to the native VLAN value associated with the interface of the first/previous host. However, if the native VLAN value configured for the physical switch trunk port connected to the interface of the first host is different from the native VLAN value configured for the physical switch trunk port connected to the interface of the second host and if the virtual network device sent untagged frames intended for the native VLAN value associated with the interface of the first host, the traffic will be sent by the physical switch trunk port connected to the interface of the second host to its own native VLAN value.

As such, in response to the migration, the ESM/provisioning administrator updates the floating native VLAN value parameter configured for the virtual network device to be equal to the native VLAN value configured for the physical switch trunk port that is connected to the interface of its second/current host. As such, because the ESM/provisioning administrator has automatically updated the floating native VLAN value parameter configured for the virtual network device after the migration, the virtual network device can continue to use the correct native VLAN value to compare to its assigned VLAN value to determine whether it is appropriate to tag traffic.

This way, because the virtual network device cannot determine on its own the native VLAN value configured for the physical switch trunk port that is connected to the interface of its current host, the ESM/provisioning administrator can automatically configure the floating native VLAN value parameter for the virtual network device to match the native VLAN value configured for the physical switch trunk port that is connected to the interface of the virtual network device's current host to ensure that the virtual network device uses the appropriate native VLAN value in determining how to tag its outgoing traffic.

Figure 11:
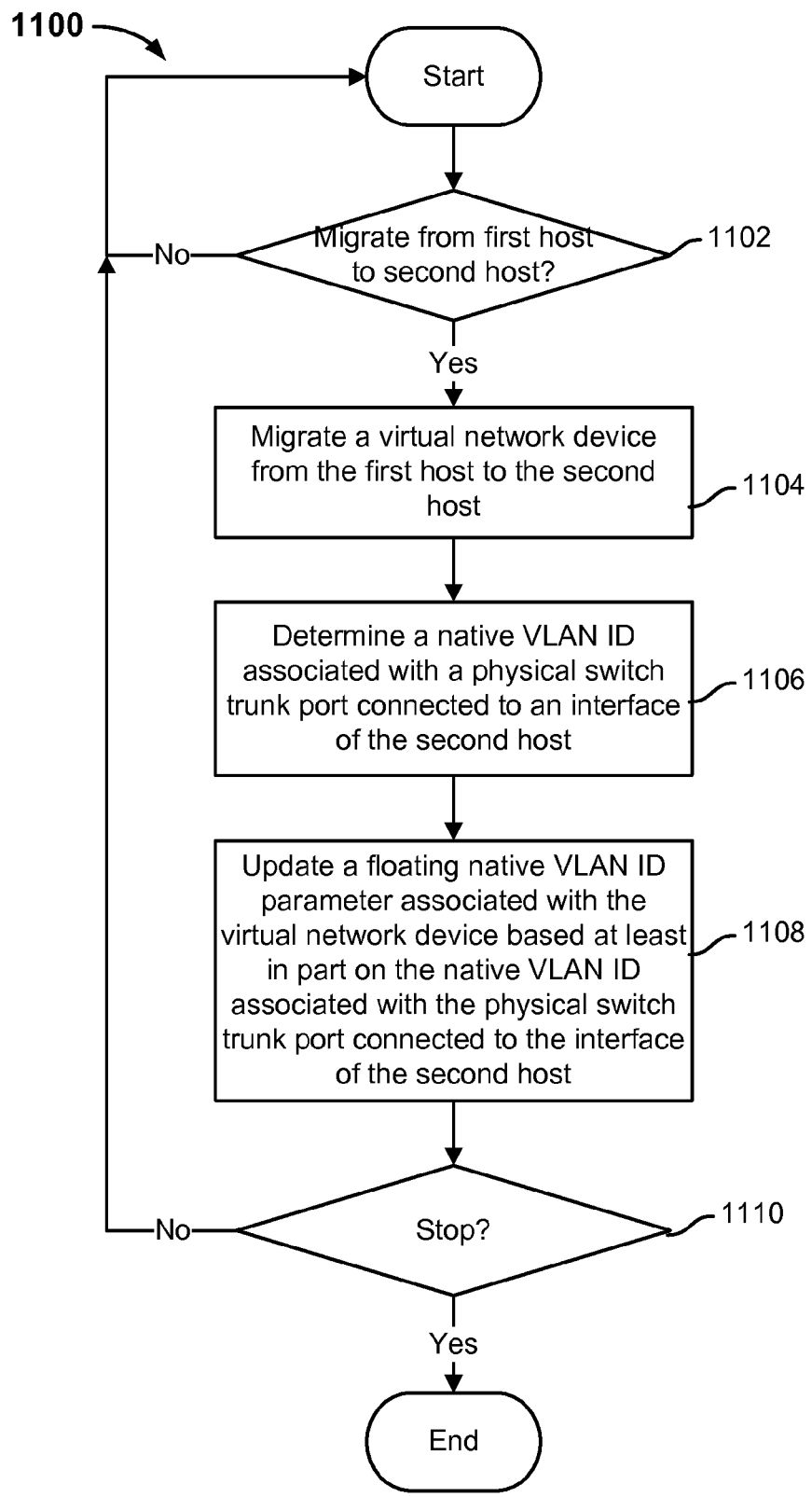
FIG. 11 is a flow diagram showing an example of a process for migrating a virtual network device from a first host to a second host in accordance with some embodiments.

FIG. 11 is a flow diagram showing an example of a process for migrating a virtual network device from a first host to a second host in accordance with some embodiments. In some embodiments, process 1100 is implemented at a system such as system 400 of FIG. 4. In some embodiments, process 1100 is implemented by an ESM and/or a provisioning administrator. In some embodiments, process 1000 of FIG. 10 is implemented using process 1100.

Process 1100 shows that each time a virtual network device is migrated from one host to another, a floating native VLAN ID parameter configured for the virtual network device may be updated.

At 1102, it is determined whether to migrate a virtual network device from a first host to a second host. In the event that it is determined to migrate the virtual network device from the first host to the second host, control is transferred to 1104. Otherwise, in the event that it is determined to not migrate the virtual network device from the first host to the second host, 1102 is checked again at a later time. As described above, a virtual network device may be migrated from being attached to a VGT port group at a first host to being attached to a VGT port group at a second host for various reasons. A first example reason is that the first host fails and so the virtual network device is migrated to an operational second host. A second example reason is that maintenance needs to be performed on the first host and so the virtual network device is migrated to a second host on which maintenance is not currently performed. A third example reason is that the first host does not have additional resources (e.g., memory, processing capacity, storage, etc.) that are requested for the virtual network device and so the virtual network device is migrated to a second host that can provide the requested additional resources. At 1104, a virtual network device is migrated from the first host to the second host. In various embodiments, the virtual network device was attached to a VGT port group at the first host prior to the migration and is attached to a VGT port group at the second host subsequent to the migration. At 1106, a native VLAN ID associated with a physical switch trunk port connected to an interface of the second host is determined. At 1108, a floating native VLAN ID parameter associated with the virtual network device is updated based at least in part on the native VLAN ID associated with the physical switch trunk port connected to the interface of the second host. After the migration and the updating of the floating native VLAN ID parameter associated with the virtual network device, the virtual network device can determine whether to tag traffic using the updated floating native VLAN ID parameter while running at the second host, without any intervention from the virtual network device administrator. At 1110, it is determined whether the virtual network device is to stop running. In the event that the virtual network device is to stop running, process 1100 ends. Otherwise, in the event that it is determined that the virtual network device is not to stop running, control returns to 1102.

Figure 12:
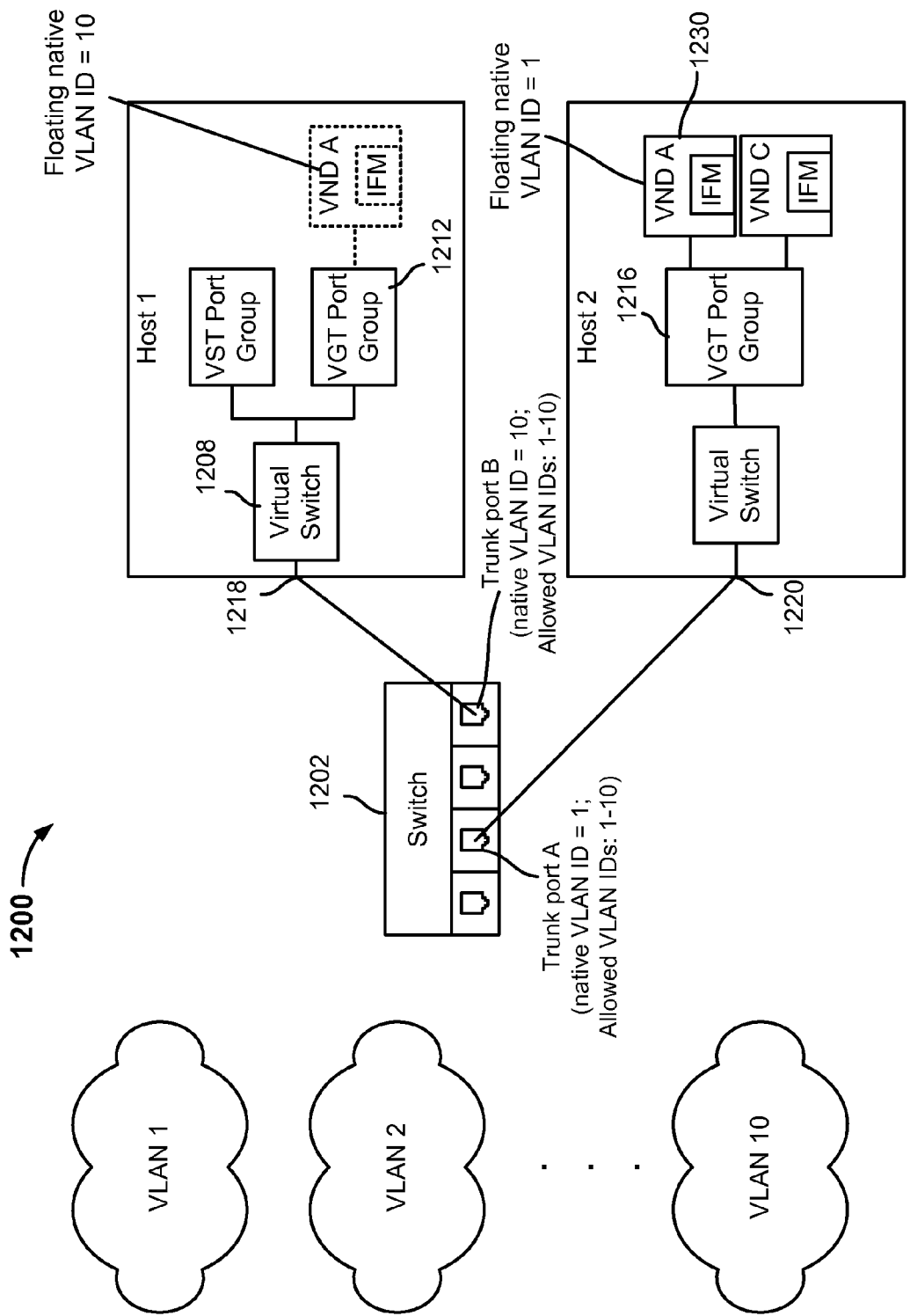
FIG. 12 is a diagram showing an example of a virtual environment in which a virtual network device is migrated from one host to another in accordance with some embodiments.

FIG. 12 is a diagram showing an example of a virtual environment in which a virtual network device is migrated from one host to another in accordance with some embodiments. In system 1200, virtual network device A (VND A 1230) wants to send traffic to a destination located in VLAN 10. VND A 1230 was initially attached to VGT port group 1212 of Host 1. When VND A 1230 was attached to VGT port group 1212, the outgoing traffic from VND A 1230 was sent by virtual switch 1208 from interface 1218 of Host 1 to trunk port B of physical switch 1202. The ESM/provisioning administrator was aware that the native VLAN ID configured for trunk port B is VLAN 10 and so configures the floating native VLAN ID parameter of VND A 1230 as VLAN 10. Trunking capable VND A 1230 had been configured to operate in "trunk" mode and was assigned VLAN 10 by the administrator of VND A 1230. As such, VND A 1230 had determined whether to tag an outgoing frame by first checking whether the assigned VLAN ID, VLAN 10, was equal to the floating native VLAN ID, VLAN 10. Because the assigned VLAN ID, VLAN 10, was equal to the floating native VLAN ID, when VND A 1230 was attached to VGT port group 1212 of Host 1, VND A 1230 left the outgoing frame untagged so that trunk port B would send the untagged packet to its native VLAN ID. Then, in response to an event (e.g., a need to perform maintenance on Host 1), VND A 1230 was removed from VGT port group 1212 and then attached to VGT port group 1216 of Host 2.

Conventionally, after being migrated to VST port group 1216 of Host 2, VND A 1230 would have continued to compare its assigned VLAN ID, VLAN 10, to native VLAN 10 as it would have been unaware that the native VLAN ID configured for trunk port A of physical switch 1202 to which interface 1220 of VND A 1230's new host, Host 2, is connected, is actually VLAN 1. As a result, conventionally, the untagged traffic from VND A 1230 would have passed through VGT port group 1216, been sent out through interface 1220 of Host 2 and received at trunk port A of physical switch 1202. Conventionally, trunk port A of physical switch 1202 would have considered the untagged traffic as being destined for its configured native VLAN ID of VLAN 1. As such, trunk port A would have sent the untagged traffic to VLAN 1, thereby breaking the traffic that should have been sent to VLAN 10.

However, according to embodiments described herein, a floating native VLAN ID parameter associated with VND A 1230 is updated to be equal to the native VLAN ID (VLAN 10) configured for trunk port A of physical switch 1202 to which interface 1220 of VND A 1230's new host, Host 2, is connected so that the interface manager (IFM) software module running on VND A 1230 can use the floating native VLAN ID parameter to determine whether to tag its outgoing traffic so that the traffic can continue to be sent to VLAN 1. By updating the floating native VLAN ID parameter of VND A 1230 to be equal to the VLAN ID (VLAN 1) configured for trunk port A associated with interface 1220 of the new host, Host 2, on which VND A 1230 is running, while VND A 1230 is operating in "trunk" mode, VND A 1230 can continue to send traffic to the correct VLAN ID despite the migration from one host to another. After VND A 1230 has been attached to VGT port group 1216 of Host 2, VND A 1230 can use its updated floating native VLAN ID parameter value of VLAN 1 to determine that because its assigned VLAN ID of VLAN 10 does not match the floating native VLAN 1, VND A 1230 will tag an outgoing frame with VLAN 10.

Figure 13:
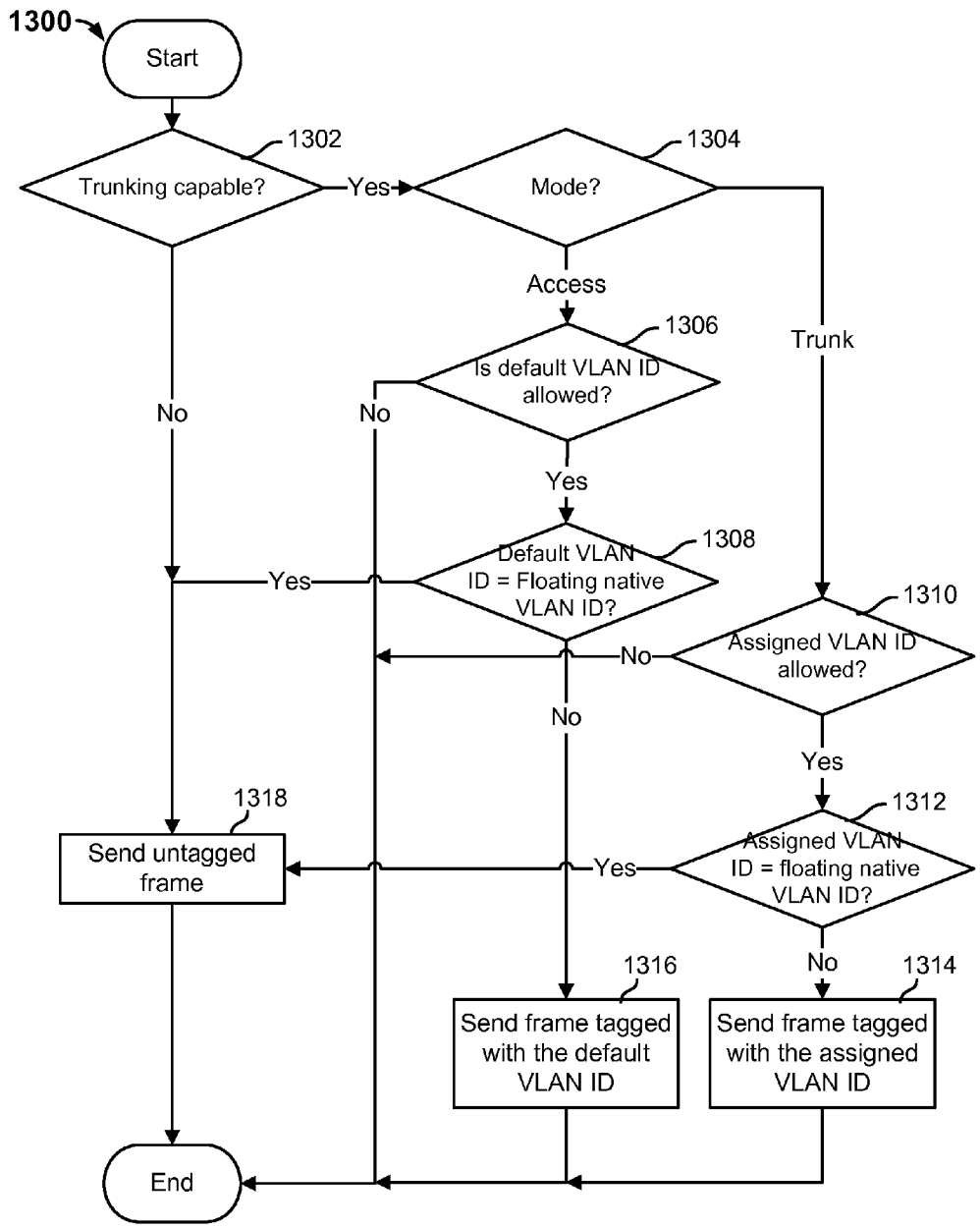
FIG. 13 is a flow diagram showing an embodiment of a process of sending outgoing traffic from a virtual network device.

FIG. 13 is a flow diagram showing an embodiment of a process of sending outgoing traffic from a virtual network device. In some embodiments, process 1300 is implemented at a system such as system 400 of FIG. 4. In some embodiments, process 1300 is implemented by an interface manager software module executing on a virtual network device.

Process 1300 shows an example process by which an interface manager executing on a virtual network device uses the virtual network device's VLAN tagging parameters (e.g., "trunking capable?" parameter, floating native VLAN ID parameter, allowed VLAN IDs parameter, and default VLAN ID parameter) as described herein to determine how/when to tag outgoing traffic.

At 1302, it is determined whether a virtual network device is trunking capable. In the event that the virtual network device is trunking capable, control is transferred to 1304. Otherwise, in the event that the virtual network device is not trunking capable, control is transferred to 1318, at which an untagged frame is sent from the virtual network device. The virtual network device is trunking capable if it is attached to a VGT port group of a virtual switch and not trunking capable if it is attached to a VST port group of a virtual switch. In some embodiments, whether the virtual network device is trunking capable can be determined from the "trunking capable?" parameter.

At 1304, the mode of the virtual network device is determined. In the event that the virtual network device is operating in "access" mode, control is transferred to 1306. Otherwise, in the event that the virtual network device is operating in "trunk" mode, control is transferred to 1310. The mode of the virtual network device can be determined from configurations generated by the administrator of the virtual network device.

At 1306, it is determined whether a default VLAN ID parameter configured for the virtual network device is allowed. In the event that the default VLAN ID is allowed, control is transferred to 1308. Otherwise, in the event that the default VLAN ID is not allowed, process 1300 ends. The default VLAN ID is determined to be allowed if it is found to be within the VLAN IDs included in the allowed VLAN IDs parameter.

At 1308, it is determined whether the default VLAN ID parameter is equal to a floating native ID parameter. In the event that the default VLAN ID is equal to the floating native ID parameter, control is transferred to 1318. Otherwise, in the event that the default VLAN ID is not equal to the floating native ID parameter, control is transferred to 1316, at which the frame is tagged with the default VLAN ID and sent.

At 1310, it is determined whether an assigned VLAN ID configured for the virtual network device is allowed. In the event that the assigned VLAN ID is allowed, control is transferred to 1312. Otherwise, in the event that the assigned VLAN ID is not allowed, process 1300 ends. The assigned VLAN ID is configured for the virtual network device by the administrator of the virtual network device. The assigned VLAN ID is determined to be allowed if it is found to be within the VLAN IDs included in the allowed VLAN IDs parameter.

At 1312, it is determined whether the assigned VLAN ID parameter is equal to a floating native ID parameter. In the event that the assigned VLAN ID is equal to the floating native ID parameter, control is transferred to 1318. Otherwise, in the event that the assigned VLAN ID is not equal to the floating native ID parameter, control is transferred to 1314, at which the frame is tagged with the assigned VLAN ID and sent.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
       determine whether to transition a virtual network device from being attached to a virtual switch tagging (VST) port group to being attached to a virtual guest tagging (VGT) port group, wherein the virtual network device comprises one or more virtual machines and wherein, when attached to the VST port group, the virtual network device is in an access mode such that it is configured to send only untagged frames, and is trunking capable when it is attached to the VGT port group such that it is configured to send both tagged and untagged frames;
       based on the results of determining, transition the virtual network device from being attached to the VST port group to being attached to the VGT port group, wherein the virtual network device is configured in the access mode before and after the transition; and
       configure the virtual network device with a default VLAN value, wherein, when attached to the VGT port group, the virtual network device is configured to use the default VLAN value to tag a frame sent from the virtual network device; and
    a memory coupled to the processor and configured to provide the processor with instructions.

2. The system of claim 1, wherein the default VLAN value is configured by a provisioning administrator.

3. The system of claim 1, wherein the virtual network device was not trunking capable when it was attached to the VST port group and the default VLAN value is configured based at least in part on a VLAN value configured for the VST port group.

4. The system of claim 1, wherein a software module executing at the virtual network device is configured to compare a floating native VLAN value configured for the virtual network device to the default VLAN value.

5. The system of claim 4, wherein in the event that the floating native VLAN value matches the default VLAN value, the virtual network device is configured to leave an outgoing frame untagged and in the event that the floating native VLAN value does not match the default VLAN value, the virtual network device is configured to tag the outgoing frame with the default VLAN value.

6. The system of claim 1, wherein a software module executing at the virtual network device is configured to compare the default VLAN value to a set of allowed VLAN values associated with the virtual network device.

7. The system of claim 6, wherein in the event that the default VLAN value is included in the set of allowed VLAN values associated with the virtual network device, the software module is configured to compare a floating native VLAN value configured for the virtual network device to the default VLAN value, and in the event that the default VLAN value is not included in the set of allowed VLAN values associated with the virtual network device, the software module is configured to not send an outgoing frame.

8. A method, comprising:
    determining whether to transition a virtual network device from being attached to a virtual switch tagging (VST) port group to being attached to a virtual guest tagging (VGT) port group, wherein the virtual network device comprises one or more virtual machines and wherein, when attached to the VST port group, the virtual network device is in an access mode such that it is configured to send only untagged frames, and is trunking capable when it is attached to the VGT port group such that it is configured to send both tagged and untagged frames;
    based on the results of the determining, transitioning the virtual network device from being attached to the VST port group to being attached to the VGT port group, wherein the virtual network device is configured in the access mode before and after the transition; and
    configuring the virtual network device with a default VLAN value, wherein, when attached to the VGT port group, the virtual network device is configured to use the default VLAN value to tag a frame sent from the virtual network device.

9. The method of claim 8, wherein the default VLAN value is configured by a provisioning administrator.

10. The method of claim 8, wherein the virtual network device was not trunking capable when it was attached to the VST port group and after the virtual network device is attached to the VGT port group, the default VLAN value is configured based at least in part on a VLAN value configured for the VST port group.

11. The method of claim 8, wherein a software module executing at the virtual network device is configured to compare a floating native VLAN value configured for the virtual network device to the default VLAN value.

12. The method of claim 11, wherein in the event that the floating native VLAN value matches the default VLAN value, the virtual network device is configured to leave an outgoing frame untagged and in the event that the floating native VLAN value does not match the default VLAN value, the virtual network device is configured to tag the outgoing frame with the default VLAN value.

13. A system, comprising:
    a processor configured to:
       migrate a virtual network device comprising one or more virtual machines from a first host to a second host, wherein the virtual network device is configured with a first floating native VLAN value associated with an interface of the first host prior to the migration;
       attach the virtual network device to a virtual switch tagging (VST) port group at the second host when the virtual network device is configured to send only untagged frames and attach the virtual network device to a virtual guest tagging (VGT) port group at the second host when the virtual network device is configured to send both tagged and untagged frames; and configure the virtual network device with a second floating native VLAN value associated with an interface of the second host, wherein the virtual network device is configured to compare the second floating VLAN value to an assigned VLAN value; and a memory coupled to the processor and configured to provide the processor with instructions.

14. The system of claim 13, wherein a provisioning administrator automatically configures the virtual network device with the second floating native VLAN value.

15. The system of claim 13, wherein the first floating native VLAN value was determined based at least in part on a native VLAN configured for a physical switch trunk port connected to the interface of the first host.

16. The system of claim 13, wherein the second floating native VLAN value is determined based at least in part on a native VLAN configured for a physical switch trunk port connected to the interface of the second host.

17. The system of claim 13, wherein a virtual network device administrator associated with the virtual network device is not responsible for configuring the second floating native VLAN value associated with the virtual network device.

18. The system of claim 13, wherein after the virtual network device is migrated to the second host, the virtual network device is configured to be in trunk mode by a virtual network device administrator.

19. The system of claim 13, wherein the assigned VLAN value is configured for the virtual network device by a virtual network device administrator.

20. The system of claim 13, wherein in the event that the second floating native VLAN value matches the assigned value, the virtual network device is configured to leave an outgoing frame untagged and in the event that the second floating native VLAN value does not match the assigned value, the virtual network device is configured to tag the outgoing frame with the assigned VLAN value.

21. The system of claim 13, wherein a software module executing at the virtual network device is configured to compare the second floating native VLAN value to the assigned VLAN value.

22. The system of claim 13, wherein the migration occurs in response to a failure related to the first host.

23. The system of claim 13, wherein the migration occurs based at least in part on an availability of requested resources associated with the first host.

24. The system of claim 13, wherein the migration occurs in response to a maintenance event associated with the first host.

25. The system of claim 13, wherein the virtual network device was attached to a VGT port group at the first host prior to the migration and wherein the virtual network device is attached to the VGT port group at the second host after the migration.

26. The system of claim 13, wherein a software module executing at the virtual network device is configured to determine that the assigned VLAN value is included in a set of allowed VLAN values associated with the virtual network device.

27. A method, comprising:
migrating a virtual network device comprising one or more virtual machines from a first host to a second host, wherein the virtual network device was configured with a first floating native VLAN value associated with an interface of the first host prior to the migration;

attaching the virtual network device to a virtual switch tagging (VST) port group at the second host when the virtual network device is configured to send only untagged frames and attaching the virtual network device to a virtual guest tagging (VGT) port group at the second host when the virtual network device is configured to send both tagged and untagged frames; and configuring the virtual network device with a second floating native VLAN value associated with an interface of the second host, wherein the virtual network device is configured to compare the second floating VLAN value to an assigned VLAN value.

28. The method of claim 27, wherein a provisioning administrator automatically configures the virtual network device with the second floating native VLAN value.

29. The method of claim 27, wherein the first floating native VLAN value was determined based at least in part on a native VLAN configured for a physical switch trunk port connected to the interface of the first host.

30. The method of claim 27, wherein the second floating native VLAN value is determined based at least in part on a native VLAN configured for a physical switch trunk port connected to the interface of the second host.

31. The method of claim 27, wherein a virtual network device administrator associated with the virtual network device is not responsible for configuring the second floating native VLAN value associated with the virtual network device.

32. The method of claim 27, wherein after the virtual network device is migrated to the second host, the virtual network device is configured to be in trunk mode by a virtual network device administrator.

33. The method of claim 27, wherein the assigned VLAN value is configured for the virtual network device by a virtual network device administrator.

34. The method of claim 27, wherein in the event that the second floating native VLAN value matches the assigned value, the virtual network device is configured to leave an outgoing frame untagged and in the event that the second floating native VLAN value does not match the assigned value, the virtual network device is configured to tag the outgoing frame with the assigned VLAN value.

35. The method of claim 27, wherein a software module executing at the virtual network device is configured to determine that the assigned VLAN value is included in a set of allowed VLAN values associated with the virtual network device.

* * * * *